US006868311B2

(12) United States Patent
Chiang et al.

(10) Patent No.: US 6,868,311 B2
(45) Date of Patent: Mar. 15, 2005

(54) METHOD AND SYSTEM FOR ON-LINE DYNAMICAL SCREENING OF ELECTRIC POWER SYSTEM

(75) Inventors: Hsiao-Dong Chiang, 305 Birchwood Dr., North Ichaca, NY (US) 14850; Atsushi Kurita, Kawasaki (JP); Hiroshi Okamoto, Tokyo (JP); Ryuya Tanabe, Tokyo (JP); Yasuyuki Tada, Kawasaki (JP); Kaoru Koyanagi, Yachiyo (JP); Yicheng Zhou, Tama (JP)

(73) Assignees: The Tokyo Electric Power Company, Incorporated, Tokyo (JP); Hsiao-Dong Chiang, North Ichaca, NY (US)

( * ) Notice: Subject to any disclaimer, the term of this patent is extended or adjusted under 35 U.S.C. 154(b) by 0 days.

(21) Appl. No.: 10/419,939

(22) Filed: Apr. 22, 2003

(65) Prior Publication Data

US 2003/0200010 A1 Oct. 23, 2003

Related U.S. Application Data

(60) Provisional application No. 60/374,148, filed on Apr. 22, 2002.

(51) Int. Cl.$^7$ .............................................. G06F 19/00
(52) U.S. Cl. ...................... 700/293; 700/286; 700/292; 702/58
(58) Field of Search ........................ 700/286, 292–294; 702/58

(56) References Cited

U.S. PATENT DOCUMENTS

| 5,483,462 A | | 1/1996 | Chiang |
| 5,629,862 A | * | 5/1997 | Brandwajn et al. ......... 700/286 |
| 5,638,297 A | | 6/1997 | Mansour et al. |

(List continued on next page.)

FOREIGN PATENT DOCUMENTS

WO    WO 97/43811    11/1997

OTHER PUBLICATIONS

Hsiao–Dong Chiang et al., "BCU Dynamic Security Assessor for Practical Power System Models", Power Engineering Society Summer Meeting, IEEE, vol. 1, © 1999, pp. 287–290.*

K.W. Chan et al., "On–line dynamic security contingency screening and ranking", IEE Proc.–Gener. Transm. Distrib., vol. 14 Mar. 1997, pp. 132–138.*

(List continued on next page.)

*Primary Examiner*—Leo Picard
*Assistant Examiner*—Elliot L Frank
(74) *Attorney, Agent, or Firm*—Oblon, Spivak, McClelland, Maier & Neustadt, P.C.

(57) ABSTRACT

A system for on-line dynamic screening of contingencies comprising postulated disturbances which an electric power system may experience, the system comprising a dynamic contingency screening program for evaluating a plurality of contingencies with a plurality of contingency classifiers based on the method of finding the controlling unstable equilibrium point of the power system known as the boundary of stability region based controlling unstable equilibrium point method by sequentially applying the contingencies to a network islanding problem classifier, S.E.P problem classifier, a large stability regions classifier, an exist point problem classifier, a ray adjustment problem classifier, an energy function problem classifier, a CUEP convergence problem classifier, and a controlling UEP (unstable equilibrium point) classifier to form a first group of stable contingencies and a second group of unstable or undecided contingencies, and a time-domain simulation program for determining which of the second group of contingencies are unstable.

61 Claims, 6 Drawing Sheets

U.S. PATENT DOCUMENTS

| | | | | |
|---|---|---|---|---|
| 5,719,787 A | * | 2/1998 | Chiang et al. | 700/293 |
| 5,745,368 A | * | 4/1998 | Ejebe et al. | 702/164 |
| 5,796,628 A | | 8/1998 | Chiang et al. | |
| 6,219,591 B1 | * | 4/2001 | Vu et al. | 700/286 |
| 6,496,757 B1 | * | 12/2002 | Flueck et al. | 700/292 |

OTHER PUBLICATIONS

C. K. Tang, et al., IEEE Transactions on Power Systems, vol. 9, No. 3, pp. 1524–1530, "Transient Stability Index from Conventional Time Domain Simulation", Aug. 1994.

E. Vaahedi, et al., IEEE Transactions on Power Systems, vol. 11, No. 4, pp. 1976–1982, "Enhanced "Second Kick" Methods for On–Line Dynamic Security Assessment", Nov. 1996.

H–D. Chiang, et al., Power System Technology, XP–010312658, pp. 1260–1265, "BCU Classifiers for On–Line Dynamic Contingency Screening of Electric Power Systems", Aug. 18, 1998.

G. W. Cauley, et al., IEEE/NTUA Conference Proceedings Article, vol. 1, XP–010279033, pp. 275–279, "On–Line Dynamic Security Assessment: Feasibility Studies", Sep. 5, 1993.

M. P. De Arizon, et al., Devices, Circuits and Systems, XP–010295617, pp. 320–326, "Real–Time Power System Security Classifier", Mar. 2, 1998.

H–D. Chiang, et al., IEEE Transactions on Circuits and Systems, vol. 42, No. 5, XP–000517824, pp. 252–265, "Theorectical Foundation of the BCU Method for Direct Stability Analysis of Network–Reduction Power System Models with Small Transfer Conductances", May 1, 1995.

EPRI Project 3103–3 Final Report, XP–000829571, "Analytical Methods for Contingency Selection and Ranking for Dynamic Security Analysis", Nov. 1993.

* cited by examiner

METHOD AND SYSTEM FOR ON-LINE DYNAMICAL SCREENING OF ELECTRIC POWER SYSTEM

CROSS-REFERENCE TO RELATED APPLICATIONS

This application claims the benefit of U.S. Provisional Application No. 60/374,148, filed Apr. 22, 2002.

BACKGROUND OF THE INVENTION

1. Field of the Invention

The invention relates to the field of electrical power systems, and more particularly to methods for on-line transient stability analysis, on-line dynamic security assessments and energy margin calculations of practical power systems.

2. Description of the Related Art

Power systems are continually experiencing disturbances. These disturbances can be classified as either event disturbances or load disturbances. Power systems are planned and operated to withstand the occurrence of certain disturbances. At present, modern energy management systems (EMS) periodically perform the task of on-line (static) security assessment to ensure the ability of the power system to withstand credible contingencies (disturbances.) The set of credible contingencies is a collection of disturbances that are likely to occur with potentially serious consequences. The assessment involves the selection of a set of credible contingencies followed by the evaluation of the system's ability to withstand their impacts.

The extension of EMS to include on-line dynamic security assessment (DSA) is desirable and is becoming a necessity for modern power systems. This extension, however, is a rather challenging task; despite the consistent pressure for such an extension, partly due to economic incentives and partly due to environmental concerns, performing DSA has long remained an off-line activity. Several significant benefits can be expected from this extension. First, power systems may be operated with operating margins reduced by a factor of 10 or more if on-line, rather than off-line, DSA is performed. A second benefit of on-line DSA is that the amount of analysis can be greatly reduced to include only those contingencies relevant to actual operating conditions.

From an engineering viewpoint, on-line security assessment requires evaluating the static as well as dynamic effects of hundreds or even thousands of credible contingencies on power systems. Static security assessment (SSA), now routinely performed in energy management systems, checks the degree of satisfaction for all relevant static constraints of post-fault (post-contingency) steady states. From a computational viewpoint, SSA needs to solve a large set. of nonlinear algebraic equations. Dynamic security assessment (DSA), concerned with power system stability/instability after contingencies, requires the handling of a large set of nonlinear differential equations in addition to the nonlinear algebraic equations involved in SSA. The computational effort required in on-line DSA is roughly three orders of magnitude higher than that for SSA.

To significantly reduce the computational burden required for on-line DSA, the strategy of using an effective scheme to screen out a large number of stable contingencies and to apply detailed simulation programs only to potentially unstable contingencies is well recognized. This strategy has been successfully implemented in on-line SSA and can potentially be applied to on-line DSA. Given a set of credible contingencies, the strategy would break the task of on-line DSA into two assessment stages:

Stage 1: Perform the task of fast dynamic contingency screening to screen out contingencies which are definitely stable from a set of credible contingencies Stage 2: Perform a detailed stability assessment and energy margin calculation for each contingency remaining after Stage 1.

Dynamic contingency screening of Stage 1 is a fundamental function of an on-line DSA system. After Stage 1, the remaining contingencies, classified as undecided or potentially unstable, are then sent to Stage 2 for detailed stability assessment and energy margin calculation. Methods based on time-domain simulation can generally be applied to Stage 2 of on-line DSA. The overall computational speed of an on-line DSA system depends greatly on the effectiveness of the dynamic contingency screening, whose objective is to identify contingencies which are definitely stable and thus do not require further stability analysis.

Under the on-line application environment, the following five requirements are essential for any classifiers intended for on-line dynamic contingency screening of modern power systems:

(A-1) (reliability measure) the classifier absolutely captures unstable contingencies; specifically, no unstable (single-swing or multi-swing) contingencies can be missed by the classifier. In other words, the ratio of the number of captured unstable contingencies to the number of actual unstable contingencies is 1.

(A-2) (efficiency measure) the classifier achieves a high yield of screening out stable contingencies, i.e., the ratio of the number of stable contingencies screened out by the classifier to the number of actual stable contingencies is as close to 1 as possible.

(A-3) (on-line computation) the classifier has little need of off-line computations and/or adjustments in order to meet the constantly changing and uncertain operating conditions.

(A-4) (speed measure) high speed, i.e. the classifier is fast for the requirement of on-line operation.

(A-5) (performance measure) the performance of the classifier in DSA with respect to changes in power system operating conditions is robust.

The requirement of the absolute capture of unstable contingencies is a reliability measure for dynamic contingency screening. The requirement of a high percentage of stable contingency drop-outs is an efficiency measure. These measures should not be degraded for different operating conditions as dictated by the requirement of robust performance. The trend of current and future power system operating environments is that on-line operational data and presumed off-line data can be very different. In a not-too-extreme case, off-line presumed data may become uncorrelated with on-line operational data. This indicates the importance of the on-line computation requirement.

Several research developments in on-line dynamic contingency screening have been reported in the literature. At present, the existing methods for dynamic contingency screening, except the one discussed in [2,3], all rely tremendously on extensive off-line simulation results to classify contingencies. These screening methods all first perform extensive numerical simulation on a set of credible contingencies using off-line network data in order to capture essential stability features of system dynamical behaviors; they then construct a classifier attempting to correctly classify contingencies on new and unseen network data in an on-line mode. Hence, these methods cannot meet the above on-line computation requirements. Furthermore, these methods cannot meet the reliability requirement.

BCU Methods

Recently, a systematic method to find the controlling unstable equilibrium point, called the BCU method, was developed and is disclosed in U.S. Pat. No. 5,483,462 to Chiang [1]. In developing a BCU method for a given power system stability model, an associated reduced-state model must be defined first. We consider the general network-preserving transient stability model with losses shown below $$\theta = -\frac{\partial U}{\partial u}(u, w, x, y) + g_1(u, w, x, y)$$

$$\theta = -\frac{\partial U}{\partial w}(u, w, x, y) + g_2(u, w, x, y)$$

$$T\dot{x} = -\frac{\partial U}{\partial x}(u, w, x, y) + g_3(u, w, x, y)$$

$$\dot{y} = z$$

$$M\dot{z} = -Dz - \frac{\partial U}{\partial y}(u, w, x, y) + g_4(u, w, x, y)$$

where $U(u, w, x, y)$ is a scalar function. Regarding the original model (1), we choose the following differential-algebraic system as the associated reduced-state model $$0 = -\frac{\partial U}{\partial u}(u, w, x, y) + g_1(u, w, x, y)$$

$$0 = -\frac{\partial U}{\partial w}(u, w, x, y) + g_2(u, w, x, y)$$

$$T\dot{x} = -\frac{\partial U}{\partial x}(u, w, x, y) + g_3(u, w, x, y)$$

$$\dot{y} = -\frac{\partial U}{\partial y}(u, w, x, y) + g_4(u, w, x, y)$$

The fundamental ideas behind the BCU method can be explained as follows. Given a power system stability model (which admits an energy function), the BCU method first explores the special properties of the underlying model with the aim of defining an artificial, state-reduced model such that certain static as well as dynamic relationships are met. The BCU method then finds the controlling UEP of the state-reduced model by exploring the special structure of the stability boundary and the energy function of the state-reduced model. Finally, it relates the controlling UEP of the state-reduced model to the controlling UEP of the original model.

A Conceptual BCU Method

Step 1. From the fault-on trajectory $(u(t), \omega(t), x(t), y(t), z(t))$ of the network-preserving model (1), detect the exit point $(u^*, w^*, x^*, y^*)$ at which the projected trajectory $(u(t), \omega(t), x(t), y(t))$ exits the stability boundary of the post-fault reduced-state model (2).

Step 2. Use the exit point $(u^*, w^*, x^*, y^*)$, detected in Step 1, as the initial condition and integrate the post-fault reduced-state model to an equilibrium point. Let the solution be $(u_{co}, w_{co}, x_{co}, y_{co})$.

Step 3. The controlling UEP with respect to the fault-on trajectory of the original network-preserving model (1) is $(u_{co}, w_{co}, x_{co}, y_{co}, 0)$. The energy function at $(u_{co}, w_{co}, x_{co}, y_{co}, 0)$ is the critical energy for the fault-on trajectory $(u(t), \omega(t), x(t), y(t), z(t))$.

Step 1 and Step 2 of the conceptual BCU method compute the controlling UEP of the reduced-state system. Note that the post-fault reduced-state trajectory stability from the exit point $(u^*, w^*, x^*, y^*)$, Step 2 of the conceptual BCU method, will converge to an equilibrium point. Step 3 relates the controlling UEP of the reduced-state system (with respect to the projected fault-on trajectory) to the controlling UEP of the original system. There are several possible ways to numerically implement the conceptual BCU method for network-preserving power system models.

A numerical implementation of the conceptual BCU method for network-preserving power system models is presented below:

A Numerical BCU Method

Step 1. From the (sustained) fault-on trajectory $(u(t), w(t), x(t), y(t), z(t))$ of the original model (1), detect the exit point $(u^*, w^*, x^*, y^*)$ at which the projected trajectory $(u(t), w(t), x(t), y(t))$ reaches the first local maximum of the numerical potential energy function.

Step 2. Use the point $(u^*, w^*, x^*, y^*)$ as the initial condition and integrate the post-fault, reduced-state system (2) to the (first) local minimum of the following norm of the post-fault, reduced-state system (2). Let the local minimum be $(u^*_0, w^*_0, x^*_0, y^*_0)$.

Step 3. Use the point $(u^*_0, w^*_0, x^*_0, y^*_0)$ as the initial guess and solve the following set of nonlinear algebraic equations $$\left\|\frac{\partial U}{\partial u}(u, w, x, y) + g_1(u, w, x, y)\right\| +$$

$$\left\|\frac{\partial U}{\partial w}(u, w, x, y) + g_2(u, w, x, y)\right\| + \left\|\frac{\partial U}{\partial x}(u, w, x, y) + g_3(u, w, x, y)\right\| +$$

$$\left\|\frac{\partial U}{\partial y}(u, w, x, y) + g_4(u, w, x, y)\right\| = 0$$

Let the solution be $(u^*_{co}, w^*_{co}, x^*_{co}, y^*_{co})$.

Step 4. The controlling u.e.p. relative to the fault-on trajectory $(u(t), w(t), x(t), y(t), z(t))$ of the original model is $(u^*_{co}, w^*_{co}, x^*_{co}, y^*_{co}, 0)$ Steps 1 to 3 of the above numerical network-preserving BCU method compute the control-line u.e.p. of the reduced-state system (2) and Step 4 relates the controlling u.e.p. of the reduced-state system to the controlling u.e.p. of the original system. In step 3 of the numerical BCU method, the minimum gradient point (MGP) is used as a guide to search for the controlling u.e.p. From a computational viewpoint, the MGP can be used as an initial guess in the Newton method to compute the controlling u.e.p. If the MGP is sufficiently close to the controlling u.e.p., then the sequence generated by the Newton method starting from the MGP will converge to the controlling u.e.p. Otherwise, the sequence may converge to another equilibrium point or diverge. A robust nonlinear algebraic solver should be used in Step 3.

BCU Classifiers

Recently, a set of BCU classifiers for the on-line dynamic contingency screening of electric power systems was developed [2,3], and is disclosed in U.S. Pat. No. 5,719,787 to Chiang and Wang [2]. However, the BCU classifiers may not always meet the five essential requirements as shown in the following numerical simulations.

Consider a 173-bus real power system model. A total of 1014 system contingencies with two different load models were screened using the BCU classifiers [1]. The types of fault considered in the evaluation were three-phase faults with fault locations at both generator and load buses. Some contingencies were faults which were cleared by opening double circuits while others were faults which were cleared by opening the single circuit. A ZIP load model with a composition of 20% constant current, 20% constant power and 60% constant impedance was used in the simulation. Both severe and mild faults were considered. All faults were assumed to have been cleared after 0.07 s. A reliable time-domain stability program was used to numerically verify all the classification results.

Giving a total of 507 contingencies to the BCU classifiers, the first BCU classifier dropped out 59 cases and classified them as unstable. These 59, cases were numerically verified by the time-domain stability program. Of the 59 cases, 58 cases were indeed unstable, according to the time-domain stability program, and 1 case was stable. The, remaining 448 contingencies were sent to the second BCU classifier for another classification. This classifier dropped 8 cases which were classified as stable and all of these were verified by the time-domain stability program as actually being either single-swing or multi-swing stable. Note that in practical application it is not necessary to send these stable contingencies (as classified by the BCU classifiers) to a time-domain program for verification. The remaining 440 contingencies were sent to BCU classifier III which screened out 0 unstable cases. The remaining 440 contingencies were sent to BCU classifier IV which screened out 332 stable cases. Among these, 10 cases were unstable, according to the time-domain stability program, and 322 cases were stable. The fifth BCU classifiers totally screened out 16 contingencies. Those contingencies were classified as unstable. Of these, 14 contingencies were stable and 2 were indeed unstable. The remaining contingencies entered the last BCU classifier for final classification. Among them, 0 cases were classified as stable, and 92 cases were classified as unstable. Among these, 12 cases were indeed unstable and 80 cases were stable, as verified by the time-domain stability program.

This numerical simulation reveals that the BCU classifiers may mis-classify unstable contingencies as stable. For instance, 10 unstable contingencies in the 173-bus system were mis-classified as stable, hence violating the reliability requirement of a dynamic security classifier.

This invention develops improved BCU classifiers for the on-line dynamical security screening of practical power systems. The improved BCU classifiers not only meet the five requirements described above but also make the strategy, previously in practice in static security assessments, applicable to on-line dynamical security assessments. Furthermore, improved BCU classifiers compute energy margins for screened stable contingencies.

To illustrate the effectiveness of the improved BCU classifiers in meeting the five essential requirements (A-1) through (A-5), we applied them to the 173-bus power system with the same system

TABLE 1

The BCU classifiers on a 173-bus damped system: ZIP Model

| Tools | Results | I (U) | II (S) | III (U) | IV (S) | V (U) | VI (S) | VI (U) | Total |
|---|---|---|---|---|---|---|---|---|---|
| BCU classifiers | Drop-out cases | 59 | 8 | 0 | 332 | 16 | 0 | 92 | 507 |

TABLE 1-continued

The BCU classifiers on a 173-bus damped system: ZIP Model

| Tools | Results | I (U) | II (S) | III (U) | IV (S) | V (U) | VI (S) | VI (U) | Total |
|---|---|---|---|---|---|---|---|---|---|
| Time-Domain (ETMSP) | Stable | 1 | 8 | 0 | 322 | 14 | 0 | 80 | 425 |
| | Unstable | 58 | 0 | 0 | 10 | 2 | 0 | 12 | 82 | system conditions and the same set of contingencies. The simulation results are presented below. Giving a total of 507 contingencies to the improved BCU classifiers, the first BCU classifier dropped out 83 cases and classified them as unstable. These 83 cases were numerically verified by the time-domain stability program. Among these, 74 cases were indeed unstable, according to the time-domain stability program, and 9 cases were stable. The remaining 424 contingencies were sent to the second BCU classifier for another classification. This classifier dropped 16 cases which were classified as stable, and they are indeed stable according to the time-domain stability program. The remaining 408 contingencies were sent to BCU classifier III which screened out 0 unstable cases. The remaining 408 contingencies were sent to BCU classifier IV which screened out 1 unstable case. This case, according to the time-domain stability program, was stable The fifth BCU classifier does not screen out any contingency. BCU classifier VI totally screened out 1 contingency which was classified as unstable. This contingency, however, is stable, according to the time-domain stability program. The remaining contingencies entered the last BCU classifier for final classification. Among them, 380 cases were classified as stable and all of these were verified by the time-domain stability program as stable; 26 cases were classified as unstable. Among these, 8 cases were indeed unstable and 18 cases were stable, as verified by the time-domain stability program.

This numerical simulation reveals that the improved BCU classifiers do not mis-classify unstable contingencies as stable, hence meeting the reliability requirement of a dynamic security classifier. We also applied the improved BCU classifiers to the 173-bus power system with the same set of contingencies and the same system conditions, except that the system dampings were set to zero. The simulation results are tabulated in Tables 2 & 3. Again, the improved BCU classifiers do not mis-classify unstable contingencies as stable on the test system.

Based on the above numerical simulations, we examine in the following the degree of satisfaction with which the improved BCU classifiers meet the essential requirements for performing on-line dynamic contingency screening of the 173-bus power system.

TABLE 2

Improved BCU Classifiers on a 173-bus damped System: ZIP model

| Tools | Results & Verifications | I (U) | II (U) | III-A (S) | III-B (U) | IV (U) | V (U) | VI (U) | VII (S) | VII (U) | Total |
|---|---|---|---|---|---|---|---|---|---|---|---|
| Improved BCU Classifiers | Screened cases | 0 | 83 | 6 | 0 | 2 | 0 | 1 | 390 | 25 | 507 |
| Time-Domain | Stable | 0 | 6 | 6 | 0 | 2 | 0 | 1 | 390 | 17 | 422 |
| | Unstable | 0 | 77 | 0 | 0 | 0 | 0 | 0 | 0 | 8 | 85 |

TABLE 3

Improved BCU Classifiers on a 173-bus undamped System: ZIP model

| Tools | Results & Verifications | I (U) | II (U) | III-A (S) | III-B (U) | IV (U) | V (U) | VI (U) | VII (S) | VII (U) | Total |
|---|---|---|---|---|---|---|---|---|---|---|---|
| Improved BCU Classifiers | Screened cases | 0 | 83 | 16 | 0 | 1 | 0 | 1 | 380 | 26 | 507 |
| Time-Domain (ETMSP) | Stable | 0 | 9 | 16 | 0 | 1 | 0 | 1 | 380 | 18 | 425 |
| | Unstable | 0 | 74 | 0 | 0 | 0 | 0 | 0 | 0 | 8 | 82 |

TABLE 4

Performance Evaluation of Improved BCU Classifiers on a 173-bus System: ZIP load model.

| # | Requirements | Description | Undamped | Damped |
|---|---|---|---|---|
| 1 | Absolute capture of unstable contingencies | Number of captured unstable cases divided by the number of actual unstable cases equals 1.0 | 100% | 100% |
| 2 | High yield of stable contingencies | Number of detected stable cases divided by the number of actual stable cases is close to but less than 1.0 | 89.41% | 92.41% |
| 3 | Little off-line computations | In compliance with on-line requirements. On-line data and off-line data may have little correlation. | Yes | Yes |
| 4 | High speed | Fast classification | Yes | Yes |
| 5 | Robust performance | The same threshold value of each classifier is applied to different power system operating conditions | Yes | Yes |

Absolute Capture and Drop-out

The improved BCU classifiers meet the requirements of absolute capture of unstable contingencies on a total of 1014 contingencies. The capture ratio (i.e. the ratio of captured unstable contingencies to the actual contingencies) is 1.0. In other words, the improved BCU classifiers capture all of the unstable contingencies.

High Drop-out Stable Contingencies

The yield of drop-out (i.e. the ratio of the dropped-cut stable contingencies to the actual stable contingencies with the improved BCU classifiers) is 90.99% (damped). 90.58% (undamped), respectively. A summary of the reliability and efficiency measure of the improved BCU classifiers on these test systems is shown in Table 4. Note that the same threshold values for each of the eight BCU classifiers were applied to these 1014 cases. No off-line computation is required with the improved BCU classifiers.

BCU-guided Time-domain Method

We next turn to Stage 2 of the on-line DSA, which is involved with detailed stability assessment and energy margin calculation. After decades of research and developments in the direct methods, it has become clear that they can not replace the time-domain approach in stability analysis. Instead, the capabilities of direct methods and that of the time-domain approach complement each other. The current direction of development is to combine a direct method and a fast time-domain method into an integrated power system stability program to take advantages of the merits of both methods.

There are several direct methods proposed in the literature for computing energy margins. From a practical viewpoint, the existing direct methods can not reliably compute accurate energy margin for every contingency. Some direct methods can compute energy margin for just some type of contingencies while the other direct methods can compute energy margins for another type of contingencies. Hence, one has to resort to a time-domain based method for accurate energy margin calculation of those contingencies for which direct methods fail to compute. Indeed, the task of calculating an accurate energy margin for every contingency has long been regarded as a challenging one.

We propose that any time-domain based method intended for energy margin calculation must meet the following essential requirements:

(B-1) The critical energy values computed by the method must be accurate and reliable (B-2) The critical energy values computed by the method must be compatible with the critical energy values computed by the controlling UEP (B-3) The method must be reasonably fast.

One promising approach for developing such a time-domain based method is one based on a combination of a type of direct method and a few runs of time-domain simulation.

All of the existing time-domain based methods proposed thus far for computing energy margins are composed of the following two steps:

Step 1. (stability assessment) the time-domain approach is applied to simulate the system trajectory and then assess its stability based on the simulated post-fault trajectory.

Step 2. (energy margin calculation) the corresponding energy margin is calculated based on either the simulated post-fault trajectory alone (e.g. the equal-area criterion based methods and the hybrid method) or with the inclusion of some other system trajectories (e.g. the improved hybrid method and the second-kick method).

It is obvious that these methods discriminate stable and unstable contingencies very accurately for the model validity. They are, however, too slow for on-line applications and their accuracy in computing energy margins is not satisfactory. Moreover, these time-domain based methods cannot meet the requirements (B-1) through (B-3), stated above, mostly due to the following difficulties:

The critical energy value (hence the energy margin) can only be obtained after the critical clearing time is first calculated.

They lack a theoretical basis

The relationship between fault clearing time and energy margin is rather complex and may not be a functional relationship For stable contingencies, the required computational time for time-domain simulation programs may be very long Hence, the existing time-domain methods for energy margin computation are not applicable to both Stage 1 and stage 2 of on-line DSA.

Recently, the second-kick method for computing the energy margin was disclosed in U.S. Pat. No. 5,638,297 to Mansour. Vaahedi and Chang [3]. However, as shown in several numerical simulations, the second-kick method cannot always meet essential requirements (B-1) through (B-3). In particular, the energy margins calculated by the second-kick method are usually incompatible and inconsistent with exact energy margins.

We believe that the only viable approach to develop a time-domain based method for computing energy margin is the one which satisfies the following guidelines:

(G-1) It is based on the calculation (or approximation) of the critical clearing time, (G-2) It can effectively reduce the duration of the time interval within which time-domain stability simulations are performed in order to determine the critical clearing time. (Obviously, the shorter the duration of the time interval is, the lesser the number of time-domain stability simulations is required and the faster the method will be.)

The present invention develops a (two-stage) BCU-guided time-domain method, which is a time-domain based, BCU-guided method, for stability assessment and computing critical energy values. The method is reliable and yet fast for calculating energy margin whose value is compatible with that computed by the controlling UEP method. Hence, the method meets the essential requirements (B1) through (B3). The BCU-guided time-domain method uses a BCU-guided scheme to specify, within a given time interval, a reduced-duration time interval and employs the golden bisection interpolation algorithm to the specified time interval to reduce the total number of time-domain simulations required for accurate energy margin calculation.

We also develop in this invention a novel system, called BCU-DSA, for on-line dynamic security assessments and energy margin calculations of practical power systems in modern energy management systems. The novel system meets the requirements of on-line dynamic security assessment and energy margin calculations through effective exploration of the merits of both the BCU method (and the improved BCU classifiers) and the detailed time-domain simulation program. The architecture of the novel system is shown in FIG. 1. There are two major components in this architecture: (i) a dynamic contingency screening program made up of a sequence of improved BCU classifiers whose major functions are to screen out all of those contingencies which are definitely stable from a set of credible contingencies and to capture all of the (potentially) unstable contingencies, and (ii) a BCU-guided time-domain program for stability analysis and energy margin calculation of both the (potentially) unstable and undecided contingencies captured in (i).

SUMMARY OF THE INVENTION

To fulfill the foregoing urgent needs, the present invention provides a reliable and effective system, BCU-DSA, for performing on-line dynamic security assessment (DSA) and energy margin calculations of practical power systems. In particular, the present invention develops the following:

(i) The improved BCU classifiers (ii) A BCU-guided time-domain method for stability assessment and energy margin calculation (iii) The BCU-DSA system which is a hybrid architecture of the improved BCU classifiers and BCU-guided time-domain method for on-line dynamic security assessment and ranking and energy margin calculation of practical power systems

3.1 Improved BCU Classifiers

The improved BGU classifiers (see FIG. 2) meet the five requirements (A-1) through (A-5) described above and consist of the following BCU classifiers in the specified sequential order:

Classifier I (For the Network Islanding Problem)

BCU classifier I is designed to screen out highly unstable contingencies which result in a network islanding problem.

Classifier II (For the SEP Convergence Problems)

This classifier is designed to detect potentially unstable contingencies which cause the following SEP convergence problems when a numerical method is applied to compute the post-fault stable equilibrium point (SEP) starting from the pre-fault SEP.

(i) (numerical divergence problem) there is a divergence problem in computing the post-fault stable equilibrium point (SEP) starting from the pre-fault SEP, or (ii) (incorrect convergence problem) it converges to a wrong post-fault EP (equilibrium point). In this classifier, two indices are designed to identify the contingencies which cause the SEP convergence problem.

$I_{smax}$: the maximum number of iterations in computing the (post-fault) stable equilibrium point.

$\delta_{smax}$: the maximum angle difference between the pre-fault stable equilibrium point and the computed (post-fault) stable equilibrium point.

Classifier III-A (Classifier for Large Stability Region)

This classifier is designed to screen out highly stable contingencies which result in a large (sufficient size) stability region of the underlying post-fault SEP. The following tow indices are designed for this classifier:

$T_{exit}$ the time interval needed to reach the exit point of the fault-on trajectory.

$\delta_{smax}$: The maximum angle difference between the pre-fault SEP and the computed post-fault EP.

Classifier III-B (Classifier for the Exit Point Problem)

This classifier is intended to screen out potentially unstable contingencies which result in the so-called exit point problem. It employs some dynamic information during the exit point search. Two indices are designed for this classifier. They are:

$T_{exit}$ the time interval needed to reach the exit point of the fault-on trajectory.

the potential energy difference between the pre-fault SEP and the exit point.

Given a study contingency, if the exit point problem occurs, i.e. the exit point can be found within the time interval $[0, T_{exit}]$, and if the potential energy difference is negative, then the contingency is classified as potentially unstable.

Classifier IV (Classifier for the Ray Adjustment Problem)

This classifier is intended to screen out potentially unstable contingencies based on some dynamic information during the minimum gradient point search. If the ray adjustment fails during the minimum gradient point search, then it indicates that the heuristic that the local maximum point along the ray lies on the stability boundary of the reduced-state system in the BCU method does not hold and the study contingency is classified as potentially unstable. We propose the following index for this classifier:

N (ray-adjustment): total number of failures in the process of ray adjustment.

Classifier V (Classifier for the Energy Function Problem)

In this classifier, we design an index using the property that energy functions decrease along system trajectories. If the potential energy at the minimum gradient point is greater than that at the exit point, the corresponding contingency is identified as causing the energy function problem and is classified as potentially unstable.

Classifier VI (For the UEP Convergence Problem)

This classifier is designed to detect the following UEP convergence problem, when a numerical method is applied to compute the controlling u.e.p. starting from the MGP.

(i) (numerical divergence problem) there is a divergence problem in computing the controlling u.e.p. (CUEP) starting from the MGP, or (ii) (incorrect convergence problem) it converges to a wrong controlling u.e.p., (i.e. the minimum gradient point lies in a convergence region of another u.e.p., instead of that of the controlling u.e.p.).

In this classifier, the following two indices are designed to identify those contingencies which cause the UEP convergence problem. A study contingency having UEP convergence problem is classified as potentially unstable.

$I_{smax}$ the maximum number of iterations in computing the CUEP.

$\delta_{smax}$ the maximum angle difference between the minimum gradient point and the computed UEP.

Classifier VII (Classifier for CUEP):

The remaining unclassified contingencies are then sent to BCU classifier VII for final classification. This classifier uses the energy value at the CUEP as the critical energy to classify each remaining contingency into (definitely) stable or (potentially) unstable. According to the theory of controlling UEP method, if the energy value at the fault clearing time is less than the critical energy value, then the corresponding contingency is (definitely) stable; otherwise it is (potentially) unstable.

Given the list of credible contingencies to the eight BCU classifiers, BCU classifier I is designed to screen out those contingencies which lead to network islanding while classifier II is designed to screen out those contingencies with convergence problems in computing post-fault stable equilibrium points. BCU classifier III-A is designed to filter out highly stable contingencies which have a large (post-fault) stability region while classifier III-B screens out those contingencies which cause numerical difficulties in computing exit points. BCU classifier IV screens out those contingencies which cause numerical failure in finding the MGP. BCU classifier V drops those contingencies which fail to meet the energy function requirements. BCU classifier VI screens out those contingencies which make the BCU method suffer from numerical problems in computing the controlling UEP starting from a MGP. BCU classifier VII uses the energy at the controlling UEP as the critical energy to classify every contingency left over from the previous classifiers into classes: stable contingencies and unstable contingencies. Contingencies filtered out by BC classifiers are identified as potentially unstable and are sent to a time-domain method (e.g. the BCU-guided time domain method) for definite stability analysis and margin calculation.

3.2 BCU-guided Time-domain Method

A Golden Bisection-based Method

Given a study contingency, suppose that the post-fault SEP exists and that within a certain time interval, say $[t_1, t_2]$, the post-fault system is stable if the fault clearing time is set at $t_1$ and is unstable if the fault clearing time is set at $t_2$. The critical clearing time hence lies within the interval $[t_1, t_2]$.

This invention develops a golden bisection-based algorithm to compute the critical clearing time lying in the time interval $[t_1, t_2]$ with the following steps:

A Golden Bisection-based Method

Step 1. Using the golden bisection method to calculate two fault clearing time instants from the interval $[t_1, t_2]$ $$t_0^{(1)} = 0.618 t_1 + 0.382 t_2$$

$$t_0^{(2)} = 0.618 t_2 + 0.382 t_1$$

Step 2. Perform a time-domain stability analysis for the contingency with the fault clearing time $t_0^{(1)}$. If the post-fault system is unstable, then set $t_2 = t_0^{(1)}$ and go to Step 3; otherwise set $t_1 = t_0^{(1)}$ and perform a time-domain stability analysis for the contingency with the fault clearing time $t_0^{(2)}$. If the post-fault system is stable, set $t_1 = t_0^{(2)}$; otherwise set $t_2 = t_0^{(2)}$.

Step 3. Check convergence: If $\|t_1 - t_2\| \leq \epsilon$, go to Step 4; otherwise go to Step 1.

Step 4. The critical clearing time is set as $t_1$ and the system energy at this critical clearing time is set as the critical energy.

The present invention develops a (two-stage) BCU-guided time-domain method, which is a time-domain based for stability assessment and computing critical energy values. The method is reliable and yet fast for calculating energy margin whose value is compatible with that computed by the controlling UEP method. Hence, the method meets the essential requirements (B1) through (B3). The following notations will be used in our presentation of the method $t_{cl}$_Fault clearing time $t_{mgp}$_Time at the MGP $t_{ep}$_Time at the exit point $V_{cl}^{PE}$_Potential energy at the fault clearing time $V_{cl}^{KE}$_Kinetic energy at the fault clearing time $V_{mgp}$_Energy at the MGP $V_{ep}$_Energy at the exit point $V_{uep}$_Energy at the controlling unstable equilibrium point A detailed description of the BCU-guided time-domain method for each contingency is as follows (also see FIG. 3). It is assumed that the following condition is satisfied. The method can be easily modified accordingly if the condition is not satisfied.

$$t_{cl} < \text{minimum}\{t_{uep}, t_{mgp}, t_{ep}\}$$

BCU-guided Time-domain Method

Input: a power system with related data for dynamic security assessment and a contingency Output: stability assessment and energy margin value for the contingency on the power system Step 1. Apply the BCU method (to the study power system with the contingency) to compute the exit point (i.e. the PEBS crossing point). If the exit point can be found with a certain period (e.g. within two seconds), then go to Step 2; otherwise, if the energy at the end point is positive, then the post-fault system is declared to be highly stable and the energy margin is assigned as 999 and stop the process; otherwise, the post-fault system is declared to be highly unstable and the energy margin is assigned as −999 and stop the process.

Step 2. If the energy at the exit point is positive, then go to Step 3; otherwise, the post-fault system is declared to be highly unstable and the energy margin is assigned as −999 and stop the process.

Step 3. Continue the BCU method to compute the MGP. If the MGP is found, then go to Step 6; otherwise, go to Step 4.

Step 4. Do the following: (i) (Estimation) Set the critical energy to be the energy value at the exit point, i.e. $V_{cr}=V_{ep}$, and find the corresponding fault-on time (i.e. $t_{ep}$) from the fault-on trajectory. (ii) (Verification) Perform a time domain simulation with $t_{ep}$ being the fault clearing time. If the post-fault system is stable, then set $V_{ep}$ to be $V_{cr}$, and stop the process; otherwise, go to Step 5.

Step 5. Perform a time-domain simulation of the post-fault system with the state at $t_{cl}$ as the initial condition. If it is stable, then set $t_0=t_{cl}$ and $t_1=t_{ep}$; otherwise, set $t_0=0$ and $t_1=t_{cl}$. Go to Step 8.

Step 6. Continue the BCU method to compute the CUEP. If the CUEP is found, then go to Step 9; otherwise, do the following: (i) (Estimation) Set the critical energy to be the energy value at the minimum gradient point, i.e. $V_{cr}=V_{mgp}$, and find the corresponding fault-on time (i.e. $t_{mgp}$) from the fault-on trajectory. (ii) (Verification) Perform a time domain simulation with $t_{mgp}$ being the fault clearing time. If the post-fault system is stable, then set $V_{mgp}$ as the critical energy and stop the process; otherwise, go to Step 7.

Step 7. Perform a time-domain simulation of the post-fault system with the state at $t_{cl}$ as the initial condition. If it is stable, then set $t_0=t_{cl}$ and $t_1=t_{mgp}$; otherwise, set $t_0=0$ and $t_1=t_{cl}$. Go to Step 8.

Step 8. Do the following to determine the critical energy value (i) (Interpolation) Make an interpolation between $(t_0, t_1)$ using the Golden bisection-based interpolation method to find an instant, denoted as $t^{(0)}$.

(ii) (Verification) Perform a time domain simulation with $t^{(0)}$ being the fault clearing time; if the post-fault system is stable, then treat $t^{(0)}$ as the critical clearing time and the energy value at the corresponding state as the critical energy and stop the process; otherwise set $t_1=t^{(0)}$ and go to (i) of this Step (i.e. another interpolation is conducted between the interval $(t_0, t^{(0)})$).

Step 9. The energy value at the computed CUEP is used as the critical energy value. Stop the process.

Step 9 of the BCU-guided time-domain method can be modified so as to improve the conservative nature of the BCU method at the expense of time-domain simulations. For those contingencies which are assessed by the BCU method as stable, then the corresponding energy margins are kept unchanged (i.e. the energy margin is determined based on the BCU method); for those contingencies which are assessed by the BCU method as unstable, then the corresponding energy margins can be modified as follows:

Step 10. If the contingency is assessed by the computed CUEP as stable, then the corresponding energy margin is kept unchanged and stop the process; otherwise, perform a time-domain simulation of the post-fault system with the state at $t_{cl}$ as the initial condition. If it is unstable, then set $t_0=0$ $t_1=t_{cl}$ and go to Step 8; otherwise, go to Step 11.

Step 11. Perform a time domain simulation with $t_{mgp}$ being the fault clearing time. If the post-fault system is stable, then set $V_{mgp}$ as the critical energy and stop the process; other-wise, set $t_0=t_{cl}$ and $t_1=t_{mgp}$ go to Step 8.

3.3 BCU-DSA System

The present invention provides a novel system, BCU-DSA, for performing on-line dynamic security assessment and energy margin calculations of practical power systems. The architecture of BCU-DSA is comprised of two major components (see FIG. 1): a dynamic contingency classification program made up of eight BCU classifiers and a BCU-guided time-domain simulation program. When a new cycle of DSA is warranted, a list of credible contingencies along with information from the state estimator and topological analysis are first applied to the improved BCU classifiers whose basic function is to screen out contingencies which are either potentially unstable or definitely stable. Contingencies which are classified as definitely stable by the improved BCU classifiers are assigned an energy function value and then eliminated from further stability analysis. Contingencies which are identified as potentially unstable are then sent to the BCU-guided time-domain simulation program for further stability analysis and energy margin calculation.

The BCU-DSA system, a detailed flow chart shown in FIG. 4, gives definite stability/instability assessments and accurate energy margins for every contingency of practical power systems. Contingencies dropped out by classifiers I through VI, excluding III-A, are classified as potentially unstable or undecided and are sent to the BCU-guided time domain method for definite stability analysis and energy margin calculation. Contingencies dropped out by BCU classifiers III-A and VII are classified as stable, the energy margins are already computed, and no further analysis is required. One distinguishing feature of the BCU-DSA which is novel in this invention thus not only removes the conservative nature of the BCU method but also greatly enhances both the reliability of the BCU method and the computational speed of the time-domain simulation method.

DETAILED DESCRIPTION OF THE INVENTION

This invention develops a novel system, the BCU-DSA system, for the on-line dynamic security assessment and energy margin calculation of practical power systems. The BCU-DSA system is composed of the following three major subsystems:

(i) The improved BCU classifiers (ii) A BCU-guided time-domain simulation program for stability assessment and energy margin calculator (iii) A BCU-DSA system, a hybrid architecture of the improved BCU classifiers and a BCU-guided time-domain simulation program, for on-line dynamic security assessment and energy margin calculation of practical power systems.

5-1. Improved BCU Classifiers

The main design objective of improved BCU classifiers is to ensure that all five requirements listed above for on-line dynamic contingency screening are met. To this goal, eight BCU classifiers are developed and integrated to form the improved BCU classifiers for performing on-line dynamical security classification based on both on-line and predictive data. The eight BCU classifiers perform on-line transient stability classification in a sequential order such that each BCU classifier screens out not only unstable contingencies but also those contingencies which may cause a degraded performance for the classifiers that follow sequentially.

Another design objective of the improved BCU classifiers is to ensure the following criterion:

A Conservativeness Criterion in Stability Classification

A contingency is indeed stable with respect to the provided data and model (either first-swing or multi-swing) if it is classified by the improved BCU classifiers as stable; on the other hand, if a contingency is classified as unstable by the improved BCU classifiers, then the contingency could be either stable or unstable (first-swing or multi-swing).

The above conservative criterion is important in performing on-line dynamic security assessment. All of the contingencies classified as definitely stable by each BCU classifier are then eliminated from further analysis. It is due to the definite classification of stable contingencies that high-speed dynamic security assessment can be achieved. Only those contingencies which are either undecided or identified as unstable by the improved BCU classifiers are then sent to the time-domain transient stability program for further stability analysis. Note that the only scenario in which the BCU classifiers give conservative classifications is that stable contingencies, either first-swing or multi-swing, are classified as unstable.

Figure 1:
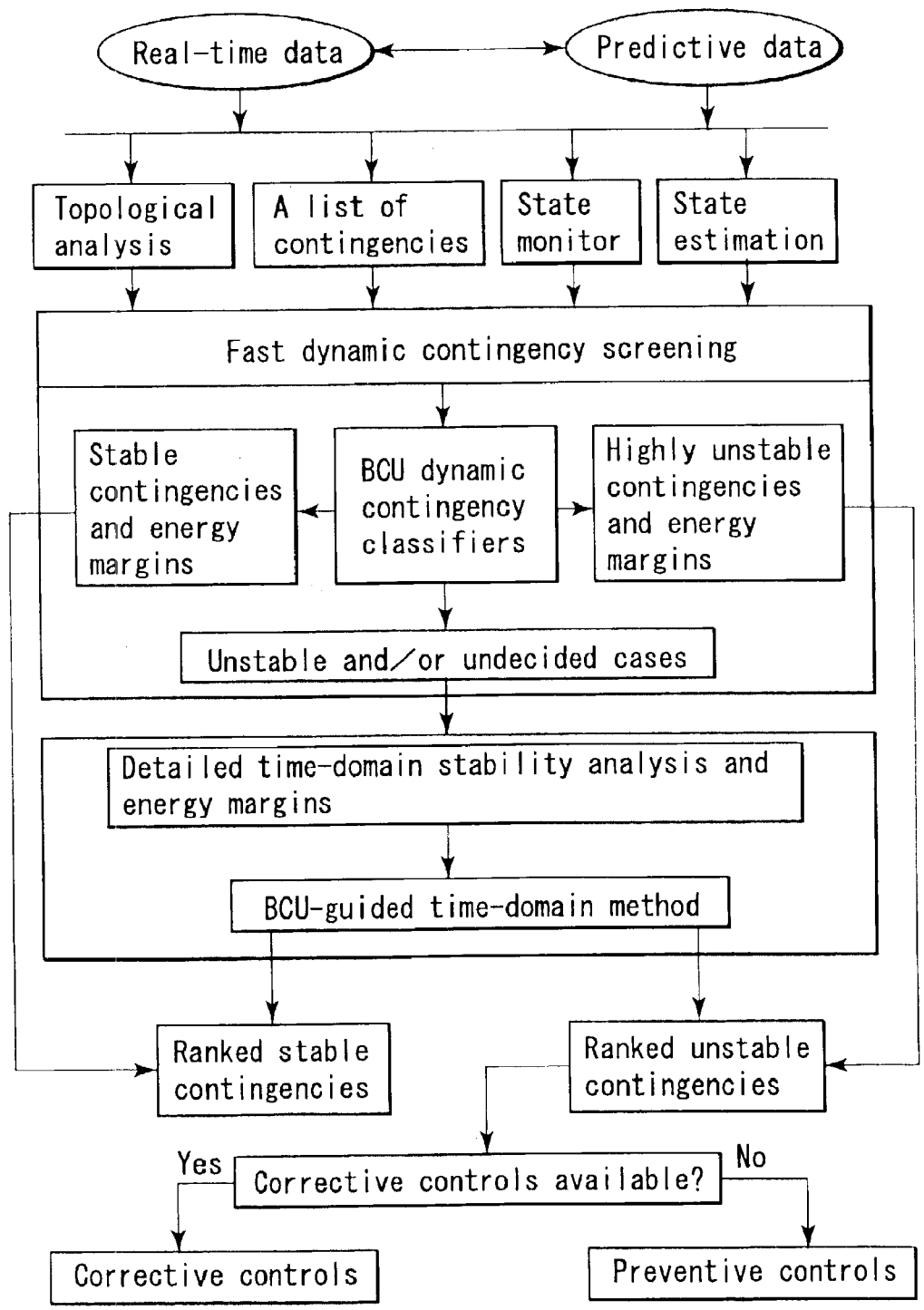
FIG. 1 is an architecture of BCU-DSA for on-line dynamic security assessment, energy margin calculations, and control.
Figure 2:
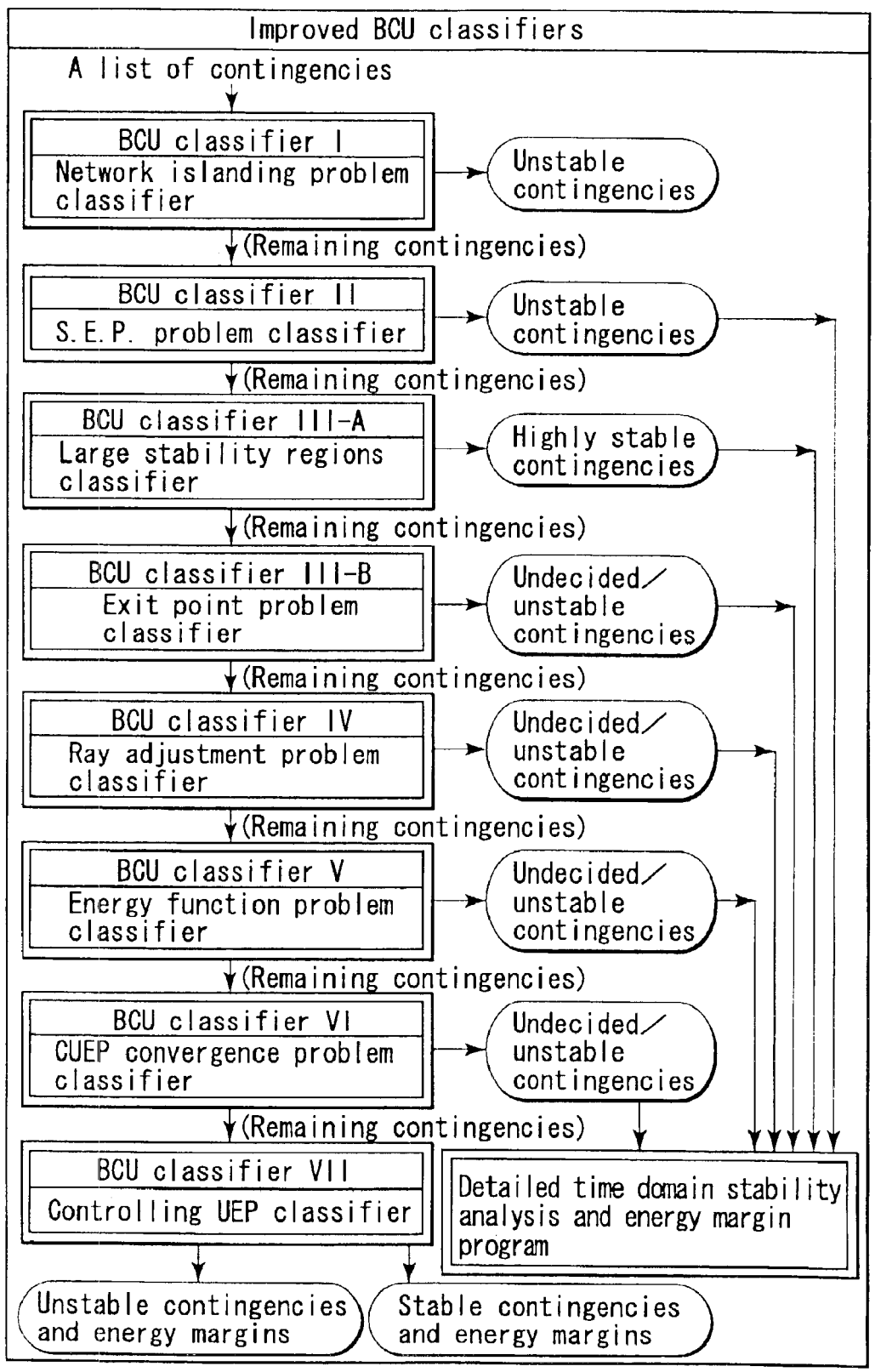
FIG. 2 is an architecture of the improved BCU classifiers for on-line dynamic contingency screening.
Figure 3:
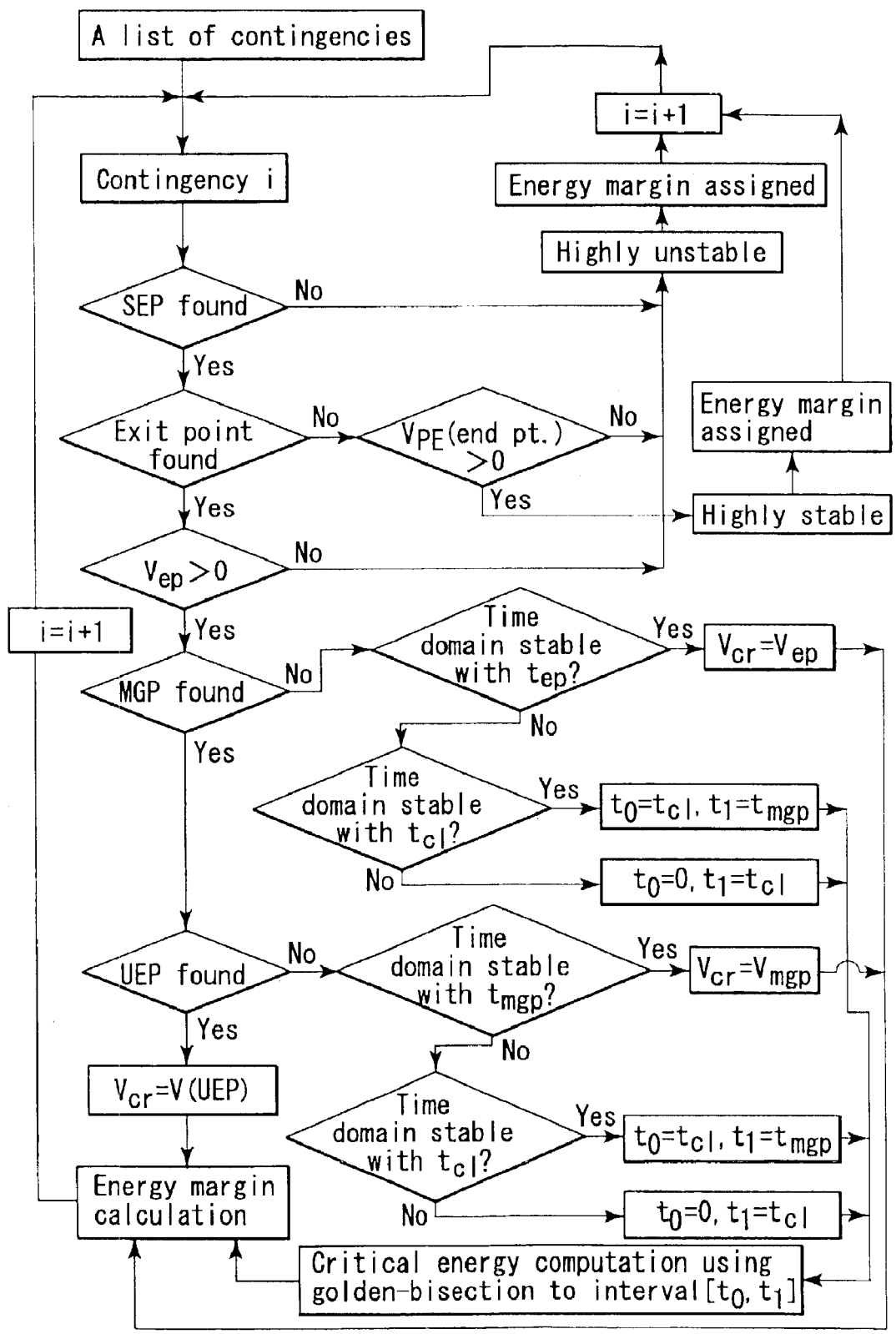
FIG. 3 is a flow Chart of the BCU-guided Time-Domain Method for Reliable Stability Assessment and Energy Margin Calculation.

The architecture of the improved BCU classifiers is show in FIG. 1. The invented improved BCU classifiers were built on the theoretical foundation of both the controlling UEP method and the BCU method, and the theory of stability region. More specifically, BCU classifiers I, II, V and VII were built on the theoretical foundation of the controlling UEP method while BCU classifiers III-A, III-B, IV, VI, and VII were established on the theoretical foundation of the BCU method and the theory of stability region. Among the eight BCU classifiers, the only one which filters out definitely stable contingencies and computes the associated energy margin is BCU classifier VII while classifier III-A filters out highly stable contingencies. The other BCU classifiers aim to screen out unstable contingencies. A detailed description of each classifier is presented below.

Classifier I (For the Network Islanding Problem)

Caused by a line-outage contingency, a power network can be separated into two subnetworks, called network islands. The power network as a whole will definitely lose synchronization due to network islands, although synchronization can be maintained within each subnetwork. Hence, a contingency is classified as highly unstable if it leads to the network islanding problem.

BCU classifier I is designed to screen out highly unstable contingencies which result in a network islanding problem.

Classifier II (For the SEP Convergence Problems)

This classifier is designed to detect potentially unstable contingencies which cause the following SEP convergence problems when a numerical method is applied to compute the post-fault stable equilibrium point (SEP) starting from the pre-fault SEP.

(i) (numerical divergence problem) there is a divergence problem in computing the post-fault stable equilibrium point (SEP) starting from the pre-fault SEP, or (ii) (incorrect convergence problem) it converges to a wrong post-fault EP (equilibrium point).

In this classifier, two indices are designed to identify the contingencies which cause the SEP convergence problem.

$I_{smax}$: the maximum number of iterations in computing the (post-fault) stable equilibrium point.

$\delta_{smax}$: the maximum angle difference between the pre-fault stable equilibrium point and the computed (post-fault) stable equilibrium point.

The first index detects the divergence problem based on the maximum number of iterations, say $I_{smax}$, in computing the post-fault SEP starting from the pre-fault SEP. If the number of iterations used exceeds a pre-specified number, then the corresponding contingency is viewed as causing the numerical divergence problem and is classified as potentially unstable. The second index uses the maximum angular difference between the pre-fault SEP and the computed post-fault EP as a criterion to determine whether the incorrect convergence problem has occurred or not. If the maximum angular difference is greater than a pre-specified number, then the corresponding contingency is considered to have caused the incorrect convergence problem and it is classified as potentially unstable.

Classifier III-A (Classifier for Large Stability Region)

This classifier is designed to screen out highly stable contingencies which result in a large (sufficient size) stability region of the underlying post-fault SEP. This classifiers makes use of some dynamic information during the exit point search process of the BCU method. The following two indices are designed for this classifier:

$T_{exit}$ the time interval needed to reach the exit point of the fault-on trajectory.

$\delta_{smax}$ the maximum angle difference between the pre-fault SEP and the computed post-fault EP.

If the exit point (i.e. the PEBS crossing point) cannot be found in the time interval $[0, T_{exit}]$, and if the maximum angle difference is less than a threshold value, then the contingency is highly stable and no further analysis is needed.

Classifier III-B (Classifier for the Exit Point Problem)

This classifier is intended to screen out potentially unstable contingencies which result in the so-called exit point problem. It employs some dynamic information during the exit point search. Two indices are designed for this classifier. They are:

$T_{exit}$ the time interval needed to reach the exit point of the fault-on trajectory.

the potential energy difference between the pre-fault SEP and the exit point.

Given a study contingency, if the exit point problem occurs, i.e. the exit point can be found within the time interval $[0, T_{exit}]$, and if the potential energy difference is negative, then the contingency is classified as potentially unstable.

Classifier IV (Classifier for the Ray Adjustment Problem)

This classifier is intended to screen out potentially unstable contingencies based on some dynamic information during the minimum gradient point search.

If the ray adjustment fails during the minimum gradient point search, then it indicates that the heuristic that the local maximum point along the ray lies on the stability boundary of the reduced-state system in the BCU method does not hold and the study contingency is potentially unstable. We propose the following index for this classifier:

N(ray-adjustment): total number of failures in the process of ray adjustment.

Given a study contingency, if the number N(ray-adjustment) is greater than a threshold value, then the contingency is considered to have a ray adjustment problem and is classified as unstable.

Classifier V (Classifier for the Energy Function Problem)

The energy function was derived based on the assumption that the transfer conductance of the power systems is small enough so that the function satisfies the three required conditions of being an energy function. If the transfer conductance is not small enough, then the (numerical) energy function cannot be used to directly assess transient stability.

In this classifier, we design an index using the property that energy functions decrease along system trajectories. If the potential energy at the minimum gradient point is greater than that at the exit point, the corresponding contingency is identified as causing the energy function problem and is classified as unstable.

Classifier VI (For the UEP Convergence Problem)

This classifier is designed to detect the following UEP convergence problem, when a numerical method is applied to compute the controlling u.e.p. starting from the MGP.

(i) (numerical divergence problem) there is a divergence problem in computing the controlling u.e.p. (CUEP) starting from the MGP, or (ii) (incorrect convergence problem) it converges to a wrong controlling u.e.p., (i.e. the minimum gradient point lies in a convergence region of another u.e.p., instead of that of the controlling u.e.p.).

In this classifier, two indices are designed to identify those contingencies which cause the UEP convergence problem. The first index, described below, detects the numerical divergence problem based on the maximum number of iterations, say $1_{smax}$, in computing the controlling the u.e.p. starting from the minimum gradient point $1_{smax}$ the maximum number of iterations in computing the CUEP.

If the number of iterations used in computing the CUEP exceeds a pre-specified number, then the corresponding contingency is viewed as causing a numerical divergence problem and is classified as potentially unstable.

The second index, described below, uses the maximum angular difference between the minimum gradient point and the computed UEP as a criterion to detect whether the incorrect convergence problem has occurred or not.

$\delta_{smax}$ the maximum angle difference between the minimum gradient point and the computed UEP.

If the maximum angular difference is greater than a pre-specified number, then the corresponding contingency is viewed as causing the incorrect convergence problem and is classified as potentially unstable.

Classifier VII (Classifier for CUEP):

The remaining unclassified contingencies are then sent to BCU classifier VII for final classification. This classifier uses the energy value at the CUEP as the critical energy to classify each remaining contingency into (definitely) stable or (potentially) unstable. According to the theory of controlling UEP method, if the energy value at the fault clearing time is less than the critical energy value, then the corresponding contingency is (definitely) stable; otherwise it is (potentially) unstable.

Based on extensive simulation results on several practical power systems, we found that the improved BCU classifiers can meet the essential requirements listed above. In particular, the improved BCU classifiers can achieve absolute capture of unstable contingencies; i.e. no unstable (single-swing or multi-swing) contingencies are missed; i.e. the ratio of the captured unstable contingencies to the actual critical contingencies is 100%. Furthermore, the yield of drop-out (i.e. the ratio of dropped-out stable contingencies to actual stable contingencies) is quite high. These simulation results reveal that the improved BCU classifiers can be highly reliable and effective for the on-line dynamic security assessment of practical power system models.

5-2. BCU-guided Time-domain Method

This invention develops a (two-stage) BCU-guided time-domain method, which is a time-domain based, BCU-guided method, for stability assessment and computing critical energy values. The method is reliable and yet fast for calculating energy margin whose value is compatible with that computed by the controlling UEP method. Hence, the method meets the essential requirements (B1) through (B3).

The BCU-guided time-domain method uses a BCU-guided scheme to specify, within a given time interval, a reduced-duration time interval and employs the golden bisection interpolation algorithm to the specified time interval to reduce the total number of time-domain simulations required for accurate energy margin calculation. For an illustrational purpose, let the CCT, say $t_{clr}$, of a contingency in a time interval, say $[0, T_{max}]$. The first stage of the BCU-guided time-domain method uses a BCU-guided scheme to identify within $[0, T_{max}]$ a sub time-interval $[t_{min}, t_{max}]$, with $t_{min} < t_{clr} < t_{max}$. The second stage of the method employs the golden-bisection algorithm, described below, to the interval $[t_{min}, t_{max}]$ and performs several time-domain simulations to pinpoint a sufficiently small interval $[t_{clr}^{min}, t_{clr}^{max}]$ satisfying the following conditions $$\begin{cases} t_{clr}^{min} < t_{clr} < t_{clr}^{max} \\ |t_{clr}^{max} - t_{clr}^{min}| < \varepsilon \end{cases}$$

We thus obtain an approximated CCT.

A Golden Bisection-based Method

The golden bisection method is a one-dimensional search method used for finding the optimal solution of a real-valued unimodal function. The golden bisection method has the reputation of excellent reliability with fast convergence and has been widely used in many commercial soft-ware packages for performing one-dimensional optimal searches. We apply the golden bisection algorithm to find the critical clearing time lying in a time interval.

Given a study contingency, suppose that the post-fault SEP exists and that within a certain time interval, say $[t_1, t_2]$, the post-fault system is stable if the fault clearing time is set at $t_1$ and is unstable if the fault clearing time is set at $t_2$. The critical clearing time hence lies within the interval $[t_1, t_2]$. We apply the golden bisection algorithm to compute the critical clearing time lying in the time interval $[t_1, t_2]$ with the following steps:

A Golden Bisection-based Method

Step 1. Using the golden bisection method to calculate two fault clearing time instants from the interval $[t_1, t_2]$ $t_0^{(1)} = 0.168 t_1 + 0.382 t_2$ $t_0^{(2)} = 0.168 t_2 + 0.382 t_1$ Step 2. Perform a time-domain stability analysis for the contingency with the fault clearing time $t_0^{(1)}$. If the postfaulty system is unstable, then set $t_2=t_0^{(1)}$ and go to Step 3; otherwise set $t_1=t_0^{(1)}$ and perform a time-domain stability analysis of the contingency with the fault clearing time $t_0^{(2)}$. If the post-fault system is stable, set $t_1=t_0^{(2)}$; otherwise set $t_2=t_0^{(2)}$.

Step 3. Check convergence: If $\|t_1-t_2\|\leq\epsilon$, go to Step 4; otherwise go to Step 1.

Step 4. The critical clearing time is set as $t_1$ and the system energy at this critical clearing time is set as the critical energy.

Prior to applying the golden bisection algorithm to compute the critical energy, one important task is to set both the lower and upper bounds of the initial (fault clearing) time interval for the golden bisection algorithm to perform bisections. In the present invention, a BCU-guided scheme for determining such an initial time interval is developed based on some of the following pieces of information:

the potential energy $V_{ep}$ at the exit point (EP), the potential energy $V_{mgp}$ at the minimum gradient point (MGP), some interpolation time-domain simulation results We next present a detailed description of the BCU-guided time-domain method for accurate calculation of critical energy. The notations used below were explained in Section 3. This description is presented for the situation that the following condition holds.

$$t_{cl} < \text{minimum } \{t_{uep}, t_{mgp}, t_{ep}\}$$

The method is easily modified accordingly if the condition is not satisfied.

BCU-guided Time-domain Method

Input: a power system with related data for dynamic security assessment and a contingency Output: stability assessment and energy margin value for the contingency on the power system Step 1. Apply the BCU method (to the study power system with the contingency) to compute the exit point (i.e. the PEBS crossing point). If the exit point can be found with a certain period (e.g., within two seconds), then go to Step 2; otherwise, if the energy at the end point is positive, then the post-fault system is declared to be highly stable and the energy margin is assigned as 999 and stop the process; otherwise, the post-fault system is declared to be highly unstable and the energy margin is assigned as −999 and stop the process.

Step 2. If the energy at the exit point is positive, then go to Step 3; otherwise, the post-fault system is declared to be highly unstable and the energy margin is assigned as −999 and stop the process.

Step 3. Continue the BCU method to compute the MGP. If the MGP is found, then go to Step 6; otherwise, go to Step 4.

Step 4. Do the following: (i) (Estimation) Set the critical energy to be the energy value at the exit point, i.e. $V_r=V_{ep}$, and find the corresponding fault-on time (i.e., $t_{ep}$) from the fault-on trajectory. (ii) (Verification) Perform a time domain simulation with $t_{ep}$ being the fault clearing time. If the post-fault system is stable, then set $V_{ep}$ to be $V_{cr}$ and stop the process; otherwise, go to Step 5.

Step 5. Perform a time-domain simulation of the post-fault system with the state at $t_{cl}$ as the initial condition. If it is stable, then set $t_0=t_{cl}$ and $t_1=t_{ep}$; otherwise, set $t_0=0$ and $t_1=t_{cl}$. Go to Step 8.

Step 6. Continue the BCU method to compute the CUEP. If the CUEP is found, then go to Step 9; otherwise, do the following: (i) (Estimation) Set the critical energy to be the energy value at the minimum gradient point, i.e. $V_{cr}=V_{mgp}$, and find the corresponding fault-on time (i.e. $t_{mgp}$) from the fault-on trajectory. (ii) (Verification) Perform a time domain simulation with $t_{mgp}$ being the fault clearing time. If the post-fault system is stable, then set $V_{mgp}$ as the critical energy and stop the process; otherwise, go to Step 7.

Step 7. Perform a time-domain simulation of the post-fault system with the state at $t_{cl}$ as the initial condition. If it is stable, then set $t_0=t_{cl}$ and $t_1=t_{mgp}$; otherwise, set $t_0=0$ and $t_1=t_{cl}$. Go to Step 8.

Step 8. Do the following to determine the critical energy value (i) (Interpolation) Make an interpolation between $(t_0, t_1)$ using the Golden bisection-based interpolation method to find an instant, denoted as $t^{(0)}$.

(ii) (Verification) Perform a time domain simulation with $t^{(0)}$ being the fault clearing time; if the post-fault system is stable, then treat $t^{(0)}$ as the critical clearing time and the energy value at the corresponding state as the critical energy and stop the process; otherwise set $t_1=t^{(0)}$ and go to (i) of this Step (i.e. another interpolation is conducted between the interval $(t_0, t^{(0)})$).

Step 9. The energy value at the computed CUEP is used as the critical energy value. Stop the process.

Step 9 of the BCU-guided time-domain method can be modified so as to improve the conservative nature of the BCU method at the expense of time-domain simulations. For those contingencies which are assessed by the BCU method as stable, then the corresponding energy margins are kept unchanged (i.e. the energy margin is determined based on the BCU method); for those contingencies which are assessed by the BCU method as unstable, then the corresponding energy margins can be modified as follows:

Step 10. If the contingency is assessed by the computed CUEP as stable, then the corresponding energy margin is kept unchanged and stop the process; otherwise, perform a time-domain simulation of the post-fault system with the state at $t_{cl}$ as the initial condition. If it is unstable, then set $t_0=0 t_1=t_{cl}$ and go to Step 8; otherwise, go to Step 11.

Step 11. Perform a time domain simulation with $t_{mgp}$ being the fault clearing time. If the post-fault system is stable, then set $V_{mgp}$ as the critical energy and stop the process; otherwise, set $t_0=t_{cl}$ and $t_1=t_{mgp}$ go to Step 8.

To illustrate the effectiveness of the invented BCU-guided time-domain method in meeting the three essential requirements (B1) through (B3), we applied the method to a practical 200-bus power system with a set of contingencies. In addition, a comparison study among the BCU-guided method, the second-kick method [3] and the exact time-domain method in terms of accuracy and computational speed is conducted on the practical power system. These numerical results are summarized into the following.

For every contingency, the BCU-guided time-domain method always computes an energy margin which is less than, and yet close to, that computed by the exact time-domain method. This property indicates the conservativeness of the BCU-guided method in computing the energy margin. This property, which lies in the spirit of direct methods, is desirable in practical applications.

The second-kick method can compute an energy margin for every contingency; however, the computed energy margin is either higher or less than that computed by the exact time-domain method. This property suggests that the second-kick method may be inconsistent in computing energy margins which can lead to both under-estimation or over-estimation in an intended applications.

A comparison between the computational speed of the BCU-guided time-domain method and that of the exact time-domain method is roughly the ratio of 1 to 2.

The three methods share one common character: they calculate energy margins for every contingency.

(speed) Overall, the BCU-guided method has the fastest computational speed among the three methods.

5-3. BCU-DSA

Figure 4:
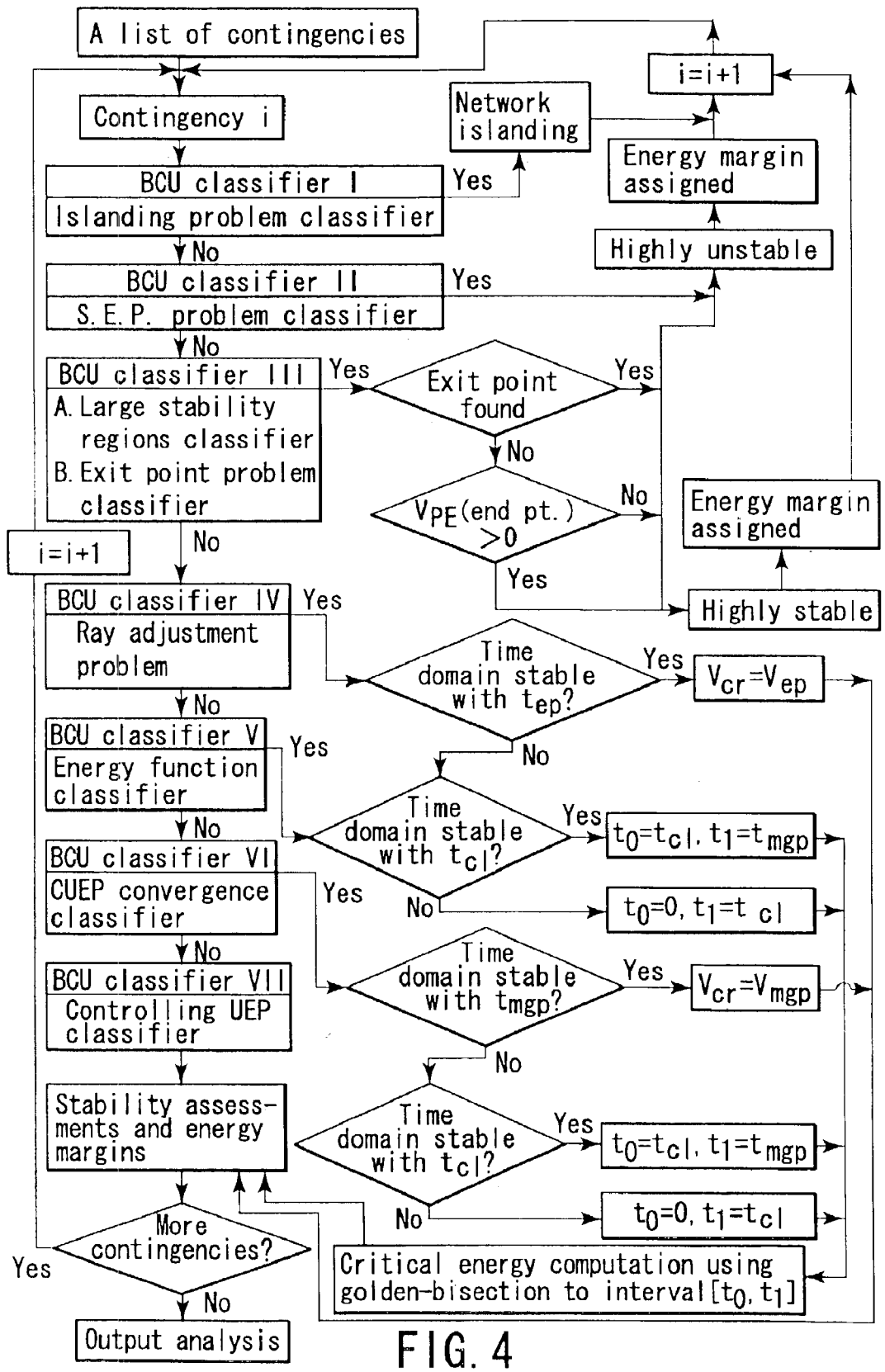
FIG. 4 is a flow Chart of the BCU-DSA system for reliable stability assessment, dynamic contingency ranking, and energy margin calculation.

This invention develops a hybrid architecture of the improved BCU classifiers and the BCU-guided time-domain simulation program, called BCU-DSA, for performing on-line dynamic security assessment, energy margin calculation and control (shown in FIG. 4). There are two major components in this architecture: (i) the improved BCU classifiers whose major functions are to screen out from a set of credible contingencies all of those contingencies which are definitely stable and to capture all of the (potentially) unstable contingencies, and (ii) a BCU-guided time-domain program for stability analysis and energy margin calculation of the (potentially) unstable contingencies captured in (i). The hybrid architecture of the improved BCU classifiers and the BCU-guided time-domain stability analysis program achieve reliability and accuracy through the effective exploration of the merits of both the BCU method (and the improved BCU classifiers) and the detailed time-domain simulation program. In order to achieve the required high speed of on-line DSA, the hybrid architecture is designed so that the BCU-guided time-domain simulation program is activated for only two types of contingencies: (1) contingencies which are classified as potentially unstable by the BCU classifiers, and (2) contingencies whose energy margins are not obtainable through the BCU method. Also, the BCU-guided time-domain stability analysis program eliminates the conservative nature of direct methods in general and BCU classifiers in particular in stability assessment: i.e., classifying a stable contingency as unstable. As a result, the invented hybrid architecture gives an exact stability assessment, i.e., one which is neither optimistic nor pessimistic.

When a new cycle of DSA is warranted, a list of credible contingencies along with information from the state estimator and topological analysis are first applied to the improved BCU classifiers whose basic function is to screen out contingencies which are either potentially unstable or definitely stable. Contingencies which are classified as definitely stable by the improved BCU classifiers are assigned an energy function value and then eliminated from further stability analysis. Contingencies which are identified as potentially unstable are then sent to the BCU-guided time-domain simulation program for further stability analysis and energy margin calculation. More specifically, the BCU-guided time-domain method is applied to perform stability assessment and energy margin calculations for those contingencies which are screened out by BCU classifiers II through VI, with the exception of III-A.

The block function of corrective actions determines if the use of timely post-fault contingency corrective actions, such as automated remedial actions, is feasible to steer the system from unacceptable conditions to an acceptable state. If appropriate corrective actions are not available, the block function of preventive actions determines the required pre-contingency preventive actions to maintain system stability should certain contingencies occur.

In the above description, the BCU-DSA system shown in FIG. 4 may be adapted to following systems.

Figure 5:
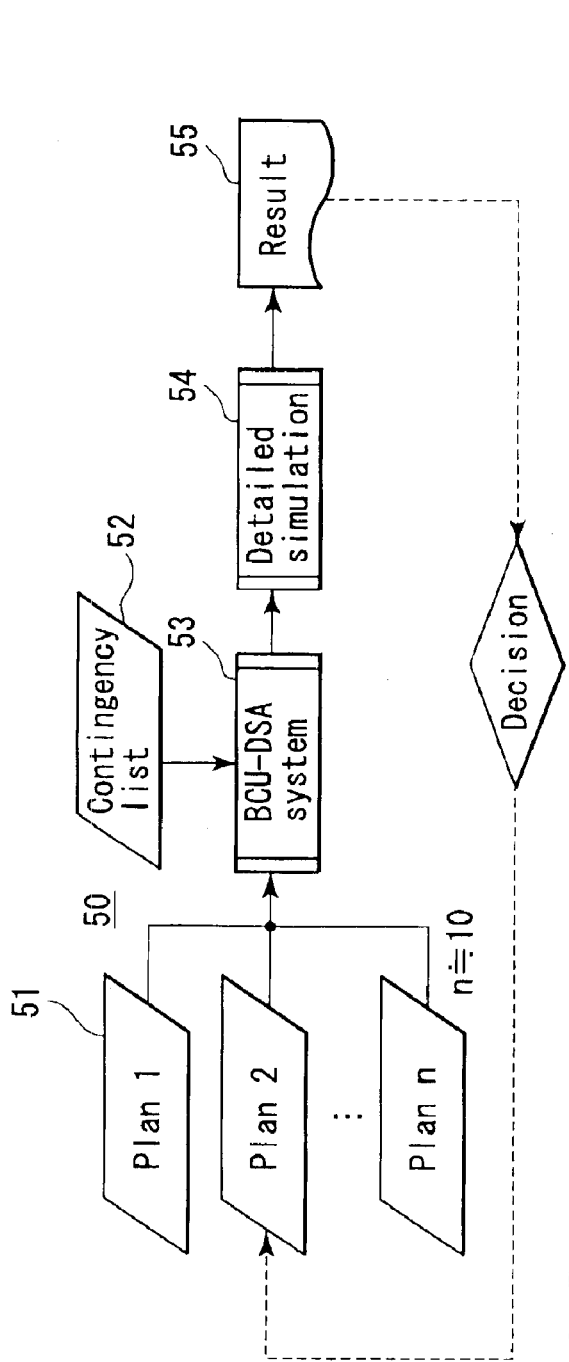
FIG. 5 is a block diagram showing a system for planning the electric power system accordance with the BCU-DSA system shown in FIG. 4.

FIG. 5 is a block diagram showing a system for planning the electric power system accordance with the BCU-DSA system shown in FIG. 4.

In FIG. 5, the present system comprises a provider 50, a BCU-DSA system 53 and a detailed simulation system 54. The provider 50 provides construction plans 51 with an electric power system and a contingency list 52 of the electric power system. The BCU-DSA system 53 performs the method of FIG. 4 accordance with any one of the construction plans 51 and the contingency list 52. The detailed simulation system 54 performs a detailed simulation accordance with a operation result of the BCU-DSA system 53. An operator utilizes a result 55 of the detailed simulation, so as to decide the construction plans 51.

Figure 6:
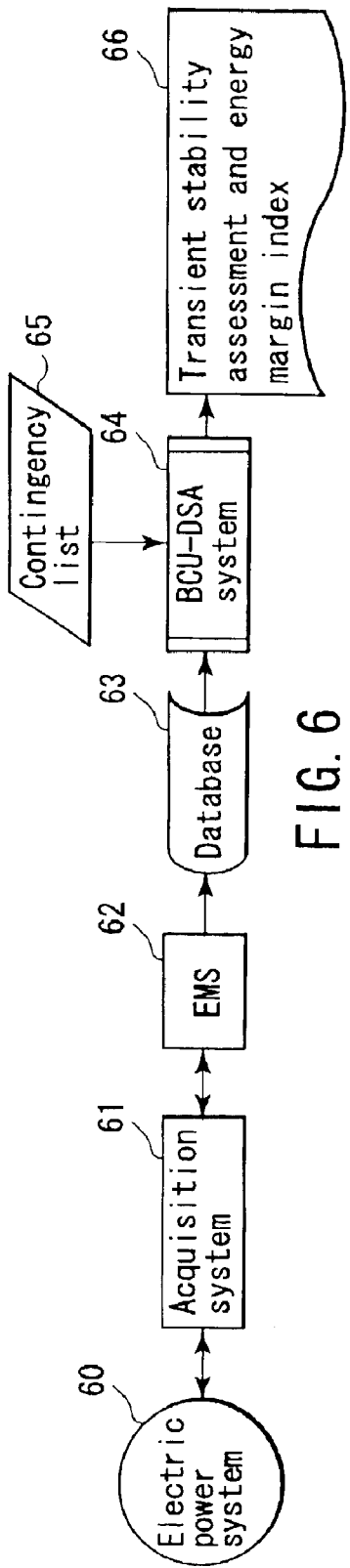
FIG. 6 is a block diagram showing a system for analysing the electric power system accordance with the BCU-DSA system shown in FIG. 4.

FIG. 6 is a block diagram showing a system for analysing the electric power system accordance with the BCU-DSA system shown in FIG. 4.

In FIG. 6, the present system comprises an acquisition system 61, an energy management system (EMS) 62, a database 63 and a BCU-DSA system 64. The acquisition system 61 acquires an information of an electric power system 60. The energy management system 62 performs an energy management of the electric power system and estimates an energy flow of the electric power system. The database 63 stores the energy flow estimated by the energy management system 62. The BCU-DSA system 64 performs the method of FIG. 4 accordance with the energy flow stored by the database 63 and a contingency list 65, so as to assess transient stability and calculate an energy margin index 66 of each contingency of contingency list in the electric power system.

Figure 7:
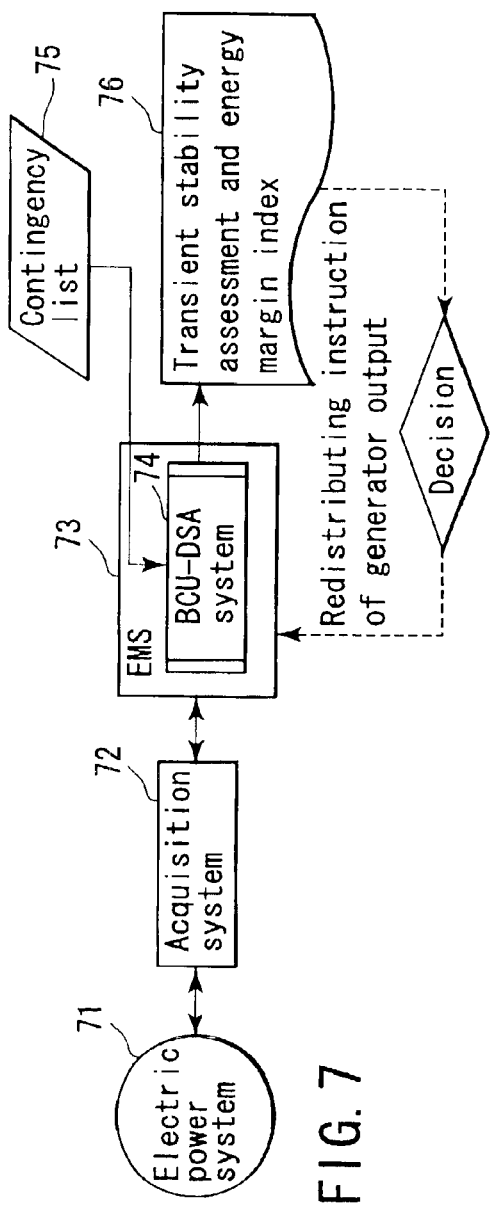
FIG. 7 is a block diagram showing a system for operating the electric power system accordance with the BCU-DSA system shown in FIG. 4.

FIG. 7 is a block diagram showing a system for operating the electric power system accordance with the BCU-DSA system shown in FIG. 4.

In FIG. 7, the present system comprises an acquisition system 72, an energy management system (EMS) 73 and a BCU-DSA system 74 associated to the EMS 73. The acquisition system 72 acquires an information of an electric power system. EMS 73 performs an energy management of the electric power system and estimates an energy flow of the electric power system. The BCU-DSA system 74 performs the method of FIG. 4 accordance with the energy flow calculated by the EMS 73 and a contingency list 75, so as to assess transient stability and calculate an energy margin index 76 of each contingency of contingency list in the electric power system which utilizes a redistributing instruction of generator output of the electric power system.

Figure 8:
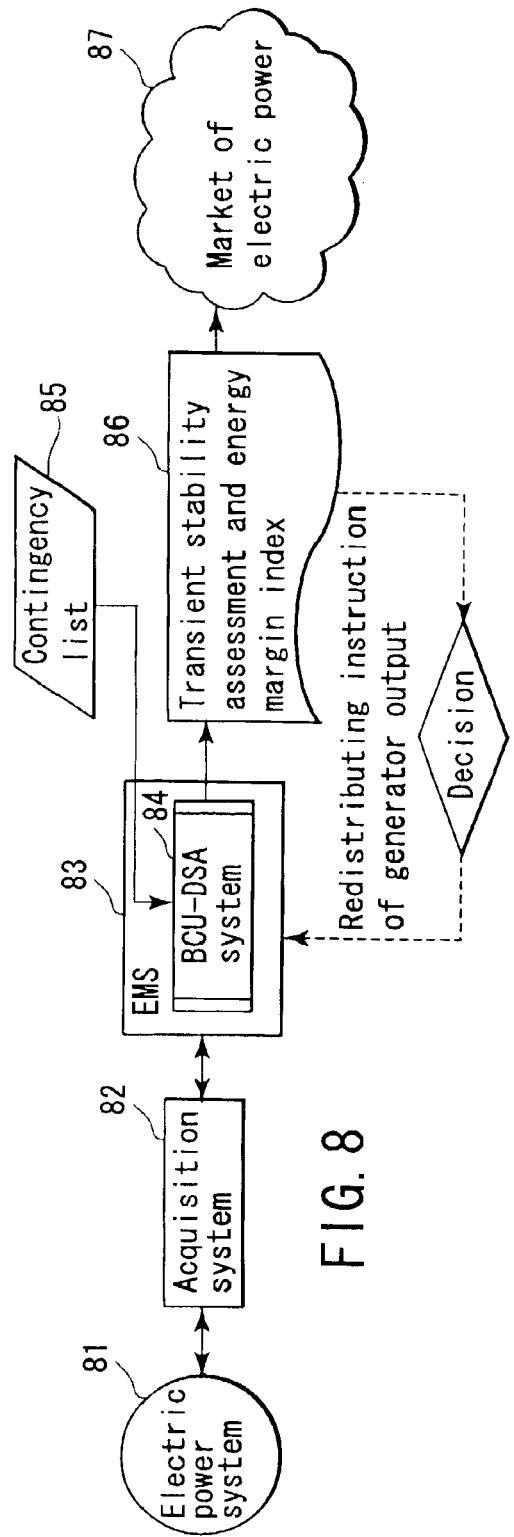
FIG. 8 is a block diagram showing an information system for a market of the electric power accordance with the BCU-DSA system shown in FIG. 4.

FIG. 8 is a block diagram showing an information system for a market of the electric power accordance with the BCU-DSA system shown in FIG. 4.

In FIG. 8, the present system comprises an acquisition system 82 an energy management system (EMS) 83 and a BCU-DSA system 84 associated to the EMS 83. The acquisition system 82 acquires an information of an electric power system. The EMS 83 performs an energy management of the electric power system and estimates an energy flow of the electric power system. The BCU-DSA system 84 performs the method of FIG. 4 accordance with the energy flow calculated by the EMS 83 and a contingency list 85, so as to assess transient stability and calculate an energy margin index 86 of the electric power system which utilizes a market 87 of a electric power and issues a redistributing instruction of generator output of the electric power system.

6. References

[1] H. D. Chiang, "On-Line Method for Determining Power System Transient Stability," U.S. Pat. No. 5,483,462, Jan. 9, 1996.

[2] H. D. Chiang and C. S. Wang, "Dynamic method for preventing voltage collapse in electrical power systems," U.S. Pat. No. 5,796,628, Aug. 18, 1998.

[3] Y. Mansour et. al., "Method of On-Line Transient Stability Assessment of Electrical Power Systems," U.S. Pat. No. 5,638,297, Jun. 10, 1997.

[4] C. Tang, C. E. Grahma, M, El-kady, and R. T. H. Ablen, "Transient Stability Index from Conventional Time Domain Simulation," IEEE Trans, on PWRS, Vol. 9, No. 3, August 1994, pp 1524–1530.

[5] E. Vaahedi, et al., "Enhanced Second kick Methods for On-Line Dynamic Security Assessment," IEEE Trans. on PWRS, Vol. 11, No. 4, November 1996, pp 1976–1982.

Although the invention has been disclosed in terms of a preferred embodiment, it will be understood that numerous variations and modifications could be made thereto without departing from the scope of the invention as defined in the following claims.

What is claimed is:

1. A method for on-line dynamic screening of contingencies comprising postulated disturbances which an electric power system may experience, said method comprising steps of:

evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies; and determining which of said second group of contingencies are unstable.

2. The method of claim 1, wherein said step of applying said network islanding problem classifier further comprises screening out highly unstable contingencies which result in a network islanding problem.

3. The method of claim 1, wherein said step of applying said stable equilibrium point problem classifier further comprises computing a post-fault stable equilibrium point starting from a pre-fault stable equilibrium point to detect potentially unstable contingencies.

4. The method of claim 1, wherein said step of applying said large stability regions classifier further comprises screening out highly stable contingencies which result in a large stability region of an underlying post-fault stable equilibrium point.

5. The method of claim 1, wherein said step of applying said exit point problem classifier further comprises screening out potentially unstable contingencies which result in an exit point problem employing some dynamic information during an exit point search.

6. The method of claim 1, wherein said step of applying said ray adjustment problem classifier further comprises screening out potentially unstable contingencies using some dynamic information during a minimum gradient point search.

7. The method of claim 1, wherein said step of applying said energy function problem classifier further comprises an index using a property that energy functions decrease along system trajectories to check a condition whether or not, when a potential energy at a minimum gradient point, if the condition satisfies, is greater than a potential energy at an exit point, a corresponding contingency is identified as causing an energy function problem and is classified as unstable.

8. The method of claim 1, wherein said step of applying said controlling unstable equilibrium point convergence problem classifier further comprises detecting a following unstable equilibrium point convergence problem which a robust nonlinear equation solver, such as Newton method, diverges when it is applied to compute the controlling unstable equilibrium point starling from a minimum gradient point.

9. The method of claim 1, wherein said step of applying said controlling unstable equilibrium point classifier further comprises using an energy value at the controlling unstable equilibrium point as a critical energy to classify each remaining contingency into stable or unstable.

10. The method of claim 1, wherein said step of applying said network islanding problem classifier further comprises screening out highly unstable contingencies which result in a network islanding problem, said step of applying said stable equilibrium point problem classifier further comprises computing a post-fault stable equilibrium point starting from a pre-fault stable equilibrium point to detect potentially unstable contingencies, said step of applying said large stability regions classifier further comprises screening out highly stable contingencies which result in a large stability region of an underlying post-fault stable equilibrium point, said step of applying said exit point problem classifier further comprises screening out potentially unstable contingencies which result in an exit point problem employing some dynamic information during an exit point search, said step of applying said ray adjustment problem classifier further comprises screening out potentially unstable contingencies based on some dynamic information during a minimum gradient point search, said step of applying said energy function problem classifier further comprises an index for screening out potentially unstable contingencies based on a potential energy at a minimum gradient point and a potential energy at an exit point, said step of applying said controlling unstable equilibrium point convergence problem classifier further comprises detecting an unstable equilibrium convergence problem which a robust numerical method diverges when it is applied to compute the controlling unstable equilibrium point starting from the minimum gradient point, and said step of applying said controlling unstable equilibrium point classifier further comprises using an energy value at the controlling unstable equilibrium point as a critical energy to classify each remaining contingency into stable or unstable.

11. The method of claim 1, further comprising steps of:

computing a minimum gradient point of a contingency when the step of applying the ray adjustment problem classifier determines the contingency without deciding that the electric power system is stable or unstable;

setting a critical energy as an energy value at an exit point $V_{cr}=V_{ep}$ and finding a corresponding fault-on time $t_{ep}$ from a fault-on trajectory, when the minimum gradient point is not found;

performing a time domain simulation with $t_{ep}$ being a fault clearing time, if the post-fault system is stable, then setting $V_{ep}$ to be critical energy $V_{cr}$ and stopping the process;

performing a time-domain simulation of the post-fault system with a state of the fault clearing time $t_{cl}$ as an initial condition if the post-fault system is stable;

setting $t_0=t_{cl}$ and $t_1=t_{mgp}$, when the post-fault system is stable, and setting $t_0=0$ and $t_1=t_{cl}$, when the post-fault system is not stable;

interpolating between $(t_0, t_1)$ using a Golden bisection-based interpolation method to find an instant, denoted as $t^{(o)}$; and performing a time domain simulation with $t^{(o)}$ being the fault clearing time and treating $t^{(o)}$ as the critical clearing time and an energy value at a corresponding state as the critical energy and stopping the process if the post-fault system is stable, and setting $t_1=t^{(o)}$ and interpolating between an interval $(t_0, t^{(o)})$ if the post-fault system is not stable.

12. The method of claim 1, further comprising steps of:

computing a minimum gradient point of a contingency when the step of applying the energy function problem classifier determines the contingency without deciding that the electric power system is stable or unstable;

performing a time-domain simulation of a post-fault system with $t_{cl}$ as an initial condition if the post-fault system is stable;

setting $t_0=t_{cl}$ and $t_1=t_{mgp}$, when the post-fault system is stable, and setting $t_0=0$ and $t_1=t_{cl}$, when the post-fault system is not stable;

interpolating between $(t_0, t_1)$ using a Golden bisection-based interpolation method to find an instant, denoted as $t^{(o)}$; and performing a time domain simulation with $t^{(o)}$ being a fault clearing time and treating $t^{(o)}$ as a critical clearing time and an energy value at a corresponding state as a critical energy and stopping the process if the post-fault system is stable, and setting $t_1=t^{(o)}$ and interpolating between an interval $(t_0, t^{(o)})$ if the post-fault system is not stable.

13. The method of claim 1, further comprising steps of:

computing a minimum gradient point of a contingency when the step of applying the controlling unstable equilibrium point convergence problem classifier determines the contingency without deciding that the electric power system is stable or unstable;

setting a critical energy as an energy value at the minimum gradient point $V_{cr}=V_{mgp}$, and finding a corresponding fault-on time $t_{mgp}$ from a fault-on trajectory, when the controlling unstable equilibrium point is not found;

performing a time domain simulation with $t_{mpg}$ being the fault clearing time, setting $V_{mgp}$ as the critical energy and stopping the process, when the post-fault system is stable;

perforating a time-domain simulation of the post-fault system with $t_{cl}$ as the initial condition, and setting $t_0=t_{cl}$ and $t_1=t_{mgp}$, when the post-fault system is stable and setting $t_0=0$ and $t_1=t_{cl}$, when the post-fault system is not stable;

interpolating between $(t_0, t_1)$ using the Golden bisection-based interpolation method to find the instant, denoted as $t^{(o)}$; and performing a time domain simulation with $t^{(o)}$ being the fault clearing time and treating $t^{(o)}$ as the critical clearing time and the energy value at the corresponding state as the critical energy and stopping the process if the post-fault system is stable, setting $t_1=t^{(o)}$ and interpolating between the interval $(t_0, t^{(o)})$ if the post-fault system is not stable.

14. A system for on-line dynamic screening of contingencies comprising postulated disturbances which an electric power system may experience, said system comprising:

a dynamic contingency screening program configured to evaluate a plurality of contingencies with a plurality of contingency classifiers based on a method of finding the controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies; and a time-domain simulation program configured to determine which of said second group of contingencies are unstable.

15. The system of claim 14, wherein said network islanding problem classifier further comprises means for screening out highly unstable contingencies which result in a network islanding problem.

16. The system of claim 14, wherein said stable equilibrium point problem classifier further comprises means for computing a post-fault stable equilibrium point starting from a pre-fault stable equilibrium point to detect potentially unstable contingencies.

17. The system of claim 14, wherein said large stability regions classifier further comprises means for screening out highly stable contingencies which result in a large stability region of an underlying post-fault stable equilibrium point.

18. The system of claim 14, wherein said exit point problem classifier further comprises means for screening out potentially unstable contingencies which result in an exit point problem based on some dynamic information during an exit point search.

19. The system of claim 14, wherein said ray adjustment problem classifier further comprises means for screening out potentially unstable contingencies based on some dynamic information during a minimum gradient point search.

20. The system of claim 14, wherein said energy function problem classifier further comprises means for screening out potentially unstable contingencies based on a potential energy at a minimum gradient point is and a potential energy at an exit point.

21. The system of claim 14, wherein said controlling unstable equilibrium point convergence problem classifier further comprises means for detecting an Unstable Equilibrium Point convergence problem which a robust numerical method diverges when it is applied to compute the controlling unstable equilibrium point starting from a minimum gradient point.

22. The system of claim 14, wherein said controlling UEP classifier further comprises means for classifying each remaining contingency into stable or unstable by using an energy value at the controlling unstable equilibrium point as a critical energy.

23. The system of claim 14, wherein said network islanding problem classifier further comprises means for screening out highly unstable contingencies which result in a network islanding problem;

said stable equilibrium point problem classifier further comprises means for computing a post-fault stable equilibrium point starting from a pre-fault stable equilibrium point to detect potentially unstable contingencies;

said large stability regions classifier further comprises means for screening out highly stable contingencies which result in a large stability region of an underlying post-fault stable equilibrium point;

said exit point problem classifier further comprises means for screening out potentially unstable contingencies which result in an exit point problem based on some dynamic information during an exit point search;

said ray adjustment problem classifier further comprises means for screening out potentially unstable contingencies based on some dynamic information during a minimum gradient point search;

said energy function problem classifier further comprises means for screening out potentially unstable contingencies on a potential energy at a minimum gradient point and a potential energy at an exit point;

said controlling unstable equilibrium point convergence problem classifier further comprises means for detecting an Unstable Equilibrium Point convergence problem which a robust numerical method diverges when it is applied to compute the controlling unstable equilibrium point starting from a minimum gradient point; and said controlling UEP classifier further comprises means for classifying each remaining contingency into stable or unstable by using energy value at the controlling unstable equilibrium point as a critical energy.

24. An on-line dynamic security assessment system adapted to perform an on-line dynamic screening of contingencies comprising postulated disturbances which an electric power system may experience, said assessment system comprising the system of any one of claims 14–23.

25. An energy management system adapted to perform an on-line dynamic screening of contingencies comprising postulated disturbances which an electric power system may experience, said management system comprising the system of any one of claims 14–23.

26. A BCU guided time-domain method which inputs a power system with related data for dynamic security assessment and a contingency and outputs a stability assessment and energy margin value for the contingency on the power system, comprising the steps of:

applying a boundary of stability region based controlling unstable equilibrium point method to compute an exit point; and declaring the stability assessment to be highly stable and assigning a large value of the energy margin for a post-fault system if the computed exit point is not found within a predetermined time interval and if the energy value at an end point of the predetermined time interval is positive.

27. The method of claim 26, further comprising steps of:

computing a minimum gradient point;

setting a critical energy as an energy value at an exit point $V_{cr}=V_{ep}$, and finding a corresponding fault-on time $t_{ep}$ from a fault-on trajectory, when the minimum gradient point is not found;

performing a time domain simulation with $t_{ep}$ being a fault clearing time, if the post-fault system is stable, then setting $V_{ep}$ to be critical energy $V_{cr}$ and stopping the process;

performing a time-domain simulation of the post-fault system with a state of the fault clearing time $t_{cl}$ as an initial conditions if the post-fault system is stable;

setting $t_0=t_{cl}$ and $t_1=t_{ep}$, when the post-fault system is stable, and setting $t_0=0$ and $t_1=t_{cl}$, when the post-fault system is not stable;

interpolating between $(t_0, t_1)$ using a Golden bisection-based interpolation method to find an instant, denoted as $t^{(o)}$; and performing a time domain simulation with $t^{(o)}$ being the fault clearing time and treating $t^{(o)}$ as the critical clearing time and an energy value at a corresponding state as the critical energy and stopping the process if the post-fault system is stable, and setting $t_1=t^{(o)}$ and interpolating between an interval $(t_0, t^{(o)})$ if the post-fault system is not stable.

28. The method of claim 27, further comprising steps of:

computing a controlling unstable equilibrium point;

setting a critical energy as an energy value at the minimum gradient point $V_{cr}=V_{mgp}$, and finding a corresponding fault-on time $t_{mgp}$ from a fault on trajectory, when the controlling unstable equilibrium point is not found;

performing a time domain simulation with $t_{mgp}$ being the fault clearing time, if the post-fault system is stable, then setting $V_{mgp}$ was the critical energy and stopping the process;

performing a time-domain simulation of the post-fault system with state at fault-clearing time $t_{cl}$ as the initial condition if the post-fault system is stable, then setting $t_0=t_{cl}$ and $t_1=t_{mgp}$, otherwise, setting $t_0=0$ and $t_1=t_{cl}$;

interpolating between $(t_0, t_1)$ using the Golden bisection-based interpolation method to find the instant, denoted as $t^{(o)}$; and perform performing a time domain simulation with $t^{(o)}$ being the fault clearing time and treating $t^{(o)}$ as the critical clearing time and the energy value at the corresponding state as the critical energy and stopping the process if the post-fault system is stable, and setting $t_1=t^{(o)}$ and interpolating between the interval $(t_0, t^{(o)})$ if the post-fault system is not stable.

29. The method of claim 27 or 28, wherein the Golden bisection-based interpolation method comprises steps of:

using the Golden bisection method to calculate two fault clearing time instants from an interval $[t_1, t_2]$, such that $$t_0^{(1)}=0.168t_1+0.382t_2 \text{ and } t_0^{(2)}=0.168t_2+0.382t_1;$$

performing a time-domain stability analysis of the contingency with the fault clearing time $t_0^{(1)}$, and setting $t_2=t_0^{(1)}$ if the post-fault system is unstable and setting $t_1=t_0^{(1)}$ if the post-fault system is stable;

performing a time-domain stability analysis of the contingency with the fault clearing time $t_0^{(2)}$, and setting $t_1=t_0^{(2)}$, if the post-fault system is stable and setting $t_2=t_0^{(2)}$ if the post-fault system is not stable;

checking convergence, if $\|t_1-t_2\| \leq \epsilon$, go to a following step, otherwise go to the using step; and setting the critical clearing time as $t_1$ and setting the system energy at the critical clearing time as the critical energy.

30. An on-line dynamic security assessment system adapted to perform an on-line screening of contingencies comprising postulated disturbances which an electric power system may experience, said assessment system being configured to perform steps of:

evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies; and determining which of said second group of contingencies are unstable.

31. The assessment system of claim 30, wherein said step of applying said network islanding problem classifier further comprises screening out highly unstable contingencies which result in a network islanding problem.

32. The assessment system of claim 30, wherein said step of applying said stable equilibrium point problem classifier further comprises computing a post-fault stable equilibrium point starting from a pre-fault stable equilibrium point to detect potentially unstable contingencies.

33. The assessment system of claim 30, wherein said step of applying said large stability regions classifier further comprises screening out highly stable contingencies which result in a large stability region of an underlying post-fault stable equilibrium point.

34. The assessment system of claim 30, wherein said step of applying said exit point problem classifier further comprises screening out potentially unstable contingencies which result in an exit point problem employing some dynamic information during an exit point search.

35. The assessment system of claim 30, wherein said step of applying said ray adjustment problem classifier further comprises screening out potentially unstable contingencies based on some dynamic information during a minimum gradient point search.

36. The assessment system of claim 30, wherein said step of applying said energy function problem classifier further comprises an index using a property that energy functions decrease along method trajectories, when a potential energy at a minimum gradient point is greater than a potential energy at an exit point, a corresponding contingency is identified as causing an energy function problem and is classified as unstable.

37. The assessment system of claim 30, wherein said step of applying said controlling unstable equilibrium point convergence problem classifier further comprises detecting a following unstable equilibrium point convergence problem, when a robust numerical method diverges when it is applied to compute the controlling unstable equilibrium point starting from a minimum gradient point.

38. The assessment system of claim 30, wherein said step of applying said controlling unstable equilibrium point classifier further comprises using an energy value at the controlling unstable equilibrium point as a critical energy to classify each remaining contingency into stable or unstable.

39. The assessment system of claim 30, wherein said step of applying said network islanding problem classifier further comprises screening out highly unstable contingencies which result in a network islanding problem, said step of applying said stable equilibrium point problem classifier further comprises computing a post-fault stable equilibrium point starting from a pre-fault stable equilibrium point to detect potentially unstable contingencies, said step of applying said large stability regions classifier further comprises screening out highly stable contingencies which result in a large stability region of an underlying post-fault stable equilibrium point, said step of applying said exit point problem classifier further comprises screening out potentially unstable contingencies which result in an exit point problem employing some dynamic information during an exit point search, said step of applying said ray adjustment problem classifier further comprises screening out potentially unstable contingencies based on some dynamic information during a minimum gradient point search, said step of applying said energy function problem classifier further comprises an index using a property that energy functions decrease along method trajectories, when a potential energy at a minimum gradient point is greater than a potential energy at an exit point, a corresponding contingency is identified as causing an energy function problem and is classified as unstable, said step of applying said controlling unstable equilibrium point convergence problem classifier further comprises detecting a following unstable equilibrium point convergence problem, when a robust numerical method diverges when it is applied to compute the controlling unstable equilibrium point starting from the minimum gradient point, and said step of applying said controlling unstable equilibrium point classifier further comprises using an energy value at the controlling unstable equilibrium point as a critical energy to classify each remaining contingency into stable or unstable.

40. An energy management system adapted to perform an on-line dynamic screening of contingencies comprising postulated disturbances which an electric power system may experience, said management system comprising steps of:

evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies; and determining which of said second group of contingencies are unstable.

41. The energy management system of claim 40, wherein said step of applying said network islanding problem classifier further comprises screening out highly unstable contingencies which result in a network islanding problem.

42. The energy management system of claim 40, wherein said step of applying said stable equilibrium point problem classifier further comprises computing a post-fault stable equilibrium point starting from a pre-fault stable equilibrium point to detect potentially unstable contingencies.

43. The energy management system of claim 40, wherein said step of applying said large stability regions classifier further comprises screening out highly stable contingencies which result in a large stability region of an underlying post-fault stable equilibrium point.

44. The energy management system of claim 40, wherein said step of applying said exit point problem classifier further comprises screening out potentially unstable contingencies which result in an exit point problem employing some dynamic information during an exit point search.

45. The energy management system of claim 40, wherein said step of applying said ray adjustment problem classifier further comprises screening out potentially unstable contingencies using some dynamic information during a minimum gradient point search.

46. The energy management system of claim 40, wherein said step of applying said energy function problem classifier further comprises an index using a property that energy functions decrease along system trajectories to check a condition whether or not, when a potential energy at a minimum gradient point, if the condition satisfies, is greater than a potential energy at an exit point, a corresponding contingency is identified as causing an energy function problem and is classified as unstable.

47. The energy management system of claim 40, wherein said step of applying said controlling unstable equilibrium point convergence problem classifier further comprises detecting a following unstable equilibrium point convergence problem which a robust nonlinear equation solver, such as Newton method, diverges when it is applied to, compute the controlling unstable equilibrium point starting from a minimum gradient point.

48. The energy management system of claim 40, wherein said step of applying said controlling unstable equilibrium point classifier further comprises using an energy value at the controlling unstable equilibrium point as a critical energy to classify each remaining contingency into stable or unstable.

49. The energy management system of claim 40, wherein
said step of applying said network islanding problem classifier further comprises screening out highly unstable contingencies which result in a network islanding problem,
said step of applying said stable equilibrium point problem classifier further comprises computing a post-fault stable equilibrium point starting from a pre-fault stable equilibrium point to detect potentially unstable contingencies,
said step of applying said large stability regions classifier further comprises screening out highly stable contingencies which result in a large stability region of an underlying post-fault stable equilibrium point,
said step of applying said exit point problem classifier further comprises screening out potentially unstable contingencies which result in an exit point problem employing some dynamic information during an exit point search,
said step of applying said ray adjustment problem classifier further comprises screening out potentially unstable contingencies based on some dynamic information during a minimum gradient point search,
said step of applying said energy function problem classifier further comprises an index for screening out potentially unstable contingencies based on a potential energy at a minimum gradient point and a potential energy at an exit point,
said step of applying said controlling unstable equilibrium point convergence problem classifier further comprises detecting an unstable equilibrium point convergence problem which a robust numerical method diverges when it is applied to compute the controlling unstable equilibrium point starting from the minimum gradient point, and
said step of applying said controlling unstable equilibrium point classifier further comprises using an energy value at the controlling unstable equilibrium point as a critical energy to classify each remaining contingency into stable or unstable.

50. A system for planning an electric power system, the system comprising:
a provider configured to provide construction plans with an electric power system and a contingency list of the electric power system;
a BCU DSA system;
a detailed simulation system configured to perform a detailed simulation in accordance with an operation result of the BCU-DSA system,
wherein said BCU-DSA system is configured in accordance with any one of the construction plans and the contingency list to perform steps of
evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies,
determining which of said second group of contingencies are unstable,
computing a minimum gradient point of a contingency when the step of applying the ray adjustment problem classifier determines the contingency without deciding that the electric power system is stable or unstable,
setting a critical energy as an energy value at an exit point $V_{cr}=V_{ep}$, and finding a corresponding fault-on time $t_{ep}$ from a fault-on trajectory, when the minimum gradient point is not found,
performing a time domain simulation with $t_{ep}$ being a fault clearing time, if the post-fault system is stable, then setting $V_{ep}$ to be critical energy $V_{cr}$ and stopping the process,
performing a time-domain simulation of the post-fault system with a state of the fault clearing time $t_{cl}$ as an initial condition if the post-fault system is stable, setting $t_0=t_{cl}$ and $t_1=t_{mgp}$, when the post-fault system is stable, and setting $t_0=0$ and $t_1=t_{cl}$, when the post-fault system is not stable,
interpolating between $(t_0, t_1)$ using a Golden bisection-based interpolation method to find an instant, denoted as $t^{(o)}$, and
performing a time domain simulation with $t^{(o)}$ being the fault clearing time and treating $t^{(o)}$ as the critical clearing time and an energy value at a corresponding state as the critical energy and slopping the process if the post-fault system is stable, and setting $t_1=t^{(o)}$ and interpolating between an interval ($t_0$, $t^{(O)}$) if the post-fault system is not stable.

51. A system for planning an electric power system, the system comprising:
    a provider configured to provide construction plans with an electric power system and a contingency list of the electric power system;
    a BCU-DSA system;
    a detailed simulation system configured to perform a detailed simulation in accordance with an operation result of the BCU-DSA system,
    wherein said BCU-DSA system is configured in accordance with any one of the construction plans and the contingency list to perform steps of
    evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies,
    determining which of said second group of contingencies are unstable,
    computing a minimum gradient point of a contingency when the step of applying the energy function problem classifier determines the contingency without deciding that the electric power system is stable or unstable,
    performing a time-domain simulation of a post-fault system with $t_{cl}$ as an initial condition, if the post-fault system is stable,
    setting $t_0=t_{cl}$ and $t_1=t_{mgp}$, when the post-fault system is stable, and setting $t_0=0$ and $t_1=t_{cl}$, when the post-fault system is not stable,
    interpolating between ($t_0$, $t_1$) using a Golden bisection-based interpolation method to find an instant, denoted as $t^{(O)}$, and
    performing a time domain simulation with $t^{(O)}$ being a fault clearing time and treating $t^{(O)}$ as a critical clearing time and an energy value at a corresponding state as a critical energy and stopping the process if the post-fault system is stable, and setting $t_1=t^{(O)}$ and interpolating between an interval ($t_0$, $t^{(O)}$) if the post-fault system is not stable.

52. A system for planning an electric power system, the system comprising:
    a provider configured to provide construction plans with an electric power system and a contingency list of the electric power system;
    a BCU-DSA system;
    a detailed simulation system configured to perform a detailed simulation in accordance with an operation result of the BCU-DSA system,
    wherein said BCU-DSA system is configured in accordance with any one of the construction plans and the contingency list to perform steps of
    evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies,
    determining which of said second group of contingencies are unstable, computing a minimum gradient point of a contingency when the step of applying the controlling unstable equilibrium point convergence problem classifier determines the contingency without deciding that the electric power system is stable or unstable,
    setting a critical energy as an energy value at the minimum gradient point $V_{cr}=V_{mgp}$, and finding a corresponding fault-on time $t_{mgp}$ from a fault-on trajectory, when the controlling unstable equilibrium point is not found,
    performing a time domain simulation with $t_{mgp}$ being the fault clearing time, setting $V_{mgp}$ as the critical energy and stopping the process when the post-fault system is stable,
    performing a time-domain simulation of the post-fault system with $t_{cl}$ as the initial condition, and setting $t_0=t_{cl}$ and $t_1=t_{mgp}$, when the post-fault system is stable and setting $t_0=0$ and $t_1=t_{cl}$, when the post-fault system is not stable,
    interpolating between ($t_0$, $t_1$) using the Golden bisection-based interpolation method to find the instant, denoted as $t^{(O)}$, and
    performing a time domain simulation with $t^{(O)}$ being the fault clearing time and treating $t^{(O)}$ as the critical clearing time and the energy value at the corresponding state as the critical energy and stopping the process if the post-fault system is stable, and setting $t_1=t^{(O)}$ and interpolating between the interval ($t_0$, $t^{(O)}$) if the post-fault system is not stable.

53. A system for analyzing an electric power system, the system comprising:
    an acquisition system configured to acquire an information of the electric power system;
    an energy management system configured to perform an energy management of the electric power system and configured to estimate an energy flow of the electric power system;
    a database configured to store the energy flow estimated by the energy management system; and
    a BCU-DSA system configured in accordance with the energy flow stored by the database and a contingency list to perform steps of
    evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the ray adjustment problem classifier determines the contingency without deciding that the electric power system is stable or unstable, setting a critical energy as an energy value at an exit point $V_{cr}=V_{ep}$, and finding a corresponding fault-on time $t_{ep}$, from a fault-on trajectory, when the minimum gradient point is not found, performing a time domain simulation with $t_{ep}$ being a fault clearing time, if the post-fault system is stable, then setting $V_{ep}$ to be critical energy $V_{cr}$ and stopping the process, performing a time-domain simulation of the post-fault system with a state of the fault clearing time $t_{cl}$ as an initial condition if the post-fault system is stable, setting $t_0=t_{cl}$ and $t_1=t_{mgp}$, when the post-fault system is stable, and selling $t_0=0$ and $t_1=t_{cl}$, when the post-fault system is not stable, interpolating between ($t_0$, $t_1$) using a Golden bisection-based interpolation method to find an instant, denoted as $t^{(0)}$, and performing a time domain simulation with $t^{(0)}$ being the fault clearing time and treating $t^{(0)}$ as the critical clearing time and an energy value at a corresponding state as the critical energy and stopping the process if the post-fault system is stable, and setting $t_1=t^{(0)}$ and interpolating between an interval ($t_0$, $t^{(0)}$) if the post-fault system is not stable.

54. A system for analyzing an electric power system, the system comprising:

an acquisition system configured to acquire an information of the electric power system;

an energy management system configured to perform an energy management of the electric power system and configured to estimate an energy flow of the electric power system;

a database configured to store the energy flow estimated by the energy management system; and a BCU-DSA system configured in accordance with the energy flow stored by the database and a contingency list to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the energy function problem classifier determines the contingency without deciding that the electric power system is stable or unstable, performing a time-domain simulation of a post-fault system with $t_{cl}$ as an initial condition, if the post-fault system is stable, setting $t_0=t_{cl}$ and $t_1=t_{mgp}$, when the post-fault system is stable, and setting $t_0=0$ and $t_1=t_{cl}$, when the post-fault system is not stable, interpolating between ($t_0$, $t_1$) using a Golden bisection-based interpolation method to find an instant, denoted as $t^{(0)}$, and performing a time domain simulation with $t^{(0)}$ being a fault clearing time and treating $t^{(0)}$ as a critical clearing time and an energy value at a corresponding state as a critical energy and stopping the process if the post-fault system is stable, and setting $t_1=t^{(0)}$ and interpolating between an interval ($t_0$, $t^{(0)}$) if the post-fault system is not stable.

55. A system for analyzing an electric power system, the system comprising:

an acquisition system configured to acquire an information of the electric power system;

an energy management system configured to perform an energy management of the electric power system and configured to estimate an energy flow of the electric power system;

a database configured to store the energy flow estimated by the energy management system; and a BCU-DSA system configured in accordance with the energy flow stored by the database and a contingency list to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the controlling unstable equilibrium point convergence problem classifier determines the contingency without deciding that the electric power system is stable or unstable, setting a critical energy as an energy value at the minimum gradient point $V_{cr}=V_{mgp}$, and finding a corresponding fault-on time $t_{mgp}$ from a fault-on trajectory, when the controlling unstable equilibrium point is not found, performing a time domain simulation with $t_{mgp}$ being the fault clearing time, setting $V_{mgp}$ as the critical energy and stopping the process when the post-fault system is stable, performing a time-domain simulation of the post-fault system with $t_{cl}$ as the initial condition, and setting $t_0=t_{cl}$ and $t_1=t_{mgp}$, when the post-fault system is stable and setting $t_0=0$ and $t_1=_{cl}$, when the post-fault system is not stable, interpolating between $(t_0, t_1)$ using the Golden bisection-based interpolation method to find the instant, denoted as $t^{(0)}$, and performing a time domain simulation with $t^{(0)}$ being the fault clearing time and treating $t^{(0)}$ as the critical clearing time and the energy value at the corresponding state as the critical energy and slopping the process if the post-fault system is stable, and setting $t_1=t^{(0)}$ and interpolating between the interval $(t_0, t^{(0)})$ if the post-fault system is not stable.

56. A system for operating an electric power system, the system comprising:

an acquisition system configured to acquire an information of the electric power system;

an energy management system configured to perform an energy management of the electric power system and configured to estimate an energy flow of the electric power system; and a BCU-DSA system associated to the energy management system configured to calculate an energy margin index of the electric power system which utilizes a redistributing instruction of generator output of the electric power system, and configured to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the ray adjustment problem classifier determines the contingency without deciding that the electric power system is stable or unstable, setting a critical energy as an energy value at an exit point $V_{cr}=V_{ep}$, and finding a corresponding fault-on time $t_{ep}$ from a fault-on trajectory, when the minimum gradient point is not found, performing a time domain simulation with $t_{ep}$ being a fault clearing time, if the post-fault system is stable, then setting $V_{ep}$ to be critical energy $V_{cr}$ and stopping the process, performing a time-domain simulation of the post-fault system with a state of the fault clearing time $t_{cl}$ as an initial condition if the post-fault system is stable, setting $t_0=t_{cl}$ and $t_1=t_{mgp}$, when the post-fault system is stable, and setting $t_0=0$ and $t_1=t_{cl}$, when the post-fault system is not stable, interpolating between $(t_0, t_1)$ using a Golden bisection-based interpolation method to find an instant, denoted as $t^{(0)}$, and performing a time domain simulation with $t^{(0)}$ being the fault clearing time and treating $t^{(0)}$ as the critical clearing time and an energy value at a corresponding state as the critical energy and stopping the process if the post-fault system is stable, and setting $t_1=t^{(0)}$ and interpolating between an interval $(t_0, t^{(0)})$ if the post-fault system is not stable.

57. A system for operating an electric power system, the system comprising:

an acquisition system configured to acquire an information of the electric power system;

an energy management system configured to perform an energy management of the electric power system and configured to estimate an energy flow of the electric power system; and a BCU-DSA system associated to the energy management system configured to calculate an energy margin index of the electric power system which utilizes a redistributing instruction of generator output of the electric power system, and configured to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the energy function problem classifier determines the contingency without deciding that the electric power system is stable or unstable, performing a time-domain simulation of a post-fault system with $t_{cl}$ as an initial condition, if the post-fault system is stable, setting $t_0=t_{cl}$ and $t_1=t_{mgp}$, when the post-fault system is stable, and setting $t_0=0$ and $t_1=t_{cl}$, when the post-fault system is not stable, interpolating between $(t_0, t_1)$ using a Golden bisection-based interpolation method to find an instant, denoted as $t^{(0)}$, and performing a time domain simulation with $t^{(0)}$ being a fault clearing time and treating $t^{(0)}$ as a ethical clearing time and an energy value at a corresponding state as a critical energy and stopping the process if the post-fault system is stable, and setting $t_1=t^{(0)}$ and interpolating between an interval $(t_0, t^{(0)})$ if the post-fault system is not stable.

58. A system for operating an electric power system, the system comprising:

an acquisition system configured to acquire an information of the electric power system;

an energy management system configured to perform an energy management of the electric power system and configured to estimate an energy flow of the electric power system; and a BCU-DSA system associated to the energy management system configured to calculate an energy margin index of the electric power system which utilizes a redistributing instruction of generator output of the electric power system, and configured to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the controlling unstable equilibrium point convergence problem classifier determines the contingency without deciding that the electric power system is stable or unstable, setting a critical energy as an energy value at the minimum gradient point $V_{cr}=V_{mgp}$, and finding a corresponding fault on time $t_{mgp}$ from a fault-on trajectory, when the controlling unstable equilibrium point is not found, performing a time domain simulation with $t_{mgp}$ being the fault clearing time, setting $V_{mgp}$ the critical energy and slopping the process when the post-fault system is stable, performing a time-domain simulation of the post-fault system with $t_{cl}$ as the initial condition, and setting $t_0=t_{cl}$ and $t_1=t_{mgp}$, when the post-fault system is stable and setting $t_0=0$ and $t_1=t_{cl}$, when the post-fault system is not stable, interpolating between $(t_0, t_1)$ using the Golden bisection-based interpolation method to find the instant, denoted as $t^{(0)}$, and performing a time domain simulation with $t^{(0)}$ being the fault clearing time and treating $t^{(0)}$ as the critical clearing time and the energy value at the corresponding state as the critical energy and stopping the process if the post-fault system is stable, and setting $t_1=t^{(0)}$ and interpolating between the interval $(t_0, t^{(0)})$ if the post-fault system is not stable.

59. An information system for a market of an electric power system, the information system comprising:

an acquisition system configured to acquire an information of the electric power system;

an energy management system configured to perform an energy management of the electric power system and configured to estimate an energy flow of the electric power system; and a BCU-DSA system associated to the energy management system configured to calculate an energy margin index of the electric power system which utilizes a market of an electric power and a redistributing instruction of generator output of the electric power system, and configured to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the ray adjustment problem classifier determines the contingency without deciding that the electric power system is stable or unstable, setting a critical energy as an energy value at an exit point $V_{cr}=V_{ep}$, and finding a corresponding fault-on time $t_{ep}$ from a fault-on trajectory, when the minimum gradient point is not found, performing a time domain simulation with $t_{ep}$ being a fault clearing time, if the post-fault system is stable, then setting $V_{ep}$ to be critical energy $V_{cr}$ and slopping the process, performing a time-domain simulation of the post-fault system with a state of the fault clearing time $t_{cl}$ as an initial condition if the post-fault system is stable, setting $t_0=t_{cl}$ and $t_1=t_{mgp}$, when the post-fault system is stable, and setting $t_0=0$ and $t_1=t_{cl}$, when the post-fault system is not stable, interpolating between $(t_0, t_1)$ using a Golden bisection-based interpolation method to find an instant, denoted as $t^{(0)}$, and performing a time domain simulation with $t^{(0)}$ being the fault clearing time and treating $t^{(0)}$ as the critical clearing time and an energy value at a corresponding state as the critical energy and stopping the process if the post-fault system is stable, and setting $t_1=t^{(0)}$ and interpolating between an interval $(t_0, t^{(0)})$ if the post-fault system is not stable.

60. An information system for a market of an electric power system, the information system comprising:

an acquisition system configured to acquire an information of the electric power system;

an energy management system configured to perform an energy management of the electric power system and configured to estimate an energy flow of the electric power system; and a BCU-DSA system associated to the energy management system configured to calculate an energy margin index of the electric power system which utilizes a market of an electric power and a redistributing instruction of generator output of the electric power system, and configured to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the energy function problem classifier determines the contingency without deciding that the electric power system is stable or unstable, performing a time-domain simulation of a post-fault system with $t_{cl}$ as an initial condition, if the post-fault system is stable, setting $t_0=t_{cl}$ and $t_1=t_{mgp}$, when the post-fault system is stable, and setting $t_0=0$ and $t_1=t_{cl}$, when the post-fault system is not stable, interpolating between $(t_0, t_1)$ using a Golden bisection-based interpolation method to find an instant, denoted as $t^{(o)}$, and performing a time domain simulation with $t^{(o)}$ being a fault clearing time and treating $t^{(o)}$ as a critical clearing time and an energy value at a corresponding state as a critical energy and stopping the process if the post-fault system is stable, and setting $t_1=t^{(o)}$ and interpolating between an interval $(t_0, t^{(o)})$ if the post-fault system is not stable.

61. An information system for a market of an electric power system, the information system comprising:

an acquisition system configured to acquire an information of the electric power system;

an energy management system configured to perform an energy management of the electric power system and configured to estimate an energy flow of the electric power system; and a BCU-DSA system associated to the energy management system configured to calculate an energy margin index of the electric power system which utilizes a market of an electric power and a redistributing instruction of generator output of the electric power system, and configured to perform steps of evaluating a plurality of contingencies with a plurality of contingency classifiers based on a method of finding a controlling unstable equilibrium point of said power system known as a boundary of stability region based controlling unstable equilibrium point method by sequentially applying said contingencies to a network islanding problem classifier, a stable equilibrium point problem classifier, a large stability regions classifier, an exit point problem classifier, a ray adjustment problem classifier, an energy function problem classifier, a controlling unstable equilibrium point convergence problem classifier, and a controlling unstable equilibrium point classifier to form a first group of stable contingencies and a second group of unstable or undecided contingencies, determining which of said second group of contingencies are unstable, computing a minimum gradient point of a contingency when the step of applying the controlling unstable equilibrium point convergence problem classifier determines the contingency without deciding that the electric power system is stable or unstable, setting a critical energy as an energy value at the minimum gradient point $V_{cr}=V_{mgp}$, and finding a corresponding fault-on time $t_{mgp}$ from a fault-on trajectory, when the controlling unstable equilibrium point is not found, performing a time domain simulation with $t_{mgp}$ being the fault clearing time, setting $V_{mgp}$ as the critical energy and stopping the process when the post-fault system is stable, performing a time-domain simulation of the post-fault system with as the initial condition, and setting $t_0=t_{cl}$ and $t_1=t_{mgp}$, when the post-fault system is stable and setting $t_0=0$ and $t_1=t_{cl}$, when the post-fault system is not stable, interpolating between $(t_0, t_1)$ using the Golden bisection-based interpolation method to find the instant, denoted as $t^{(o)}$, and performing a time domain simulation with $t^{(o)}$ being the fault clearing time and treating $t^{(o)}$ as the critical clearing time and the energy value at the corresponding state as the critical energy and stopping the process if the post-fault system is stable, and setting $t_1=t^{(o)}$ and interpolating between the interval $(t_0, t^{(o)})$ if the post-fault system is not stable.

* * * * *